(12) United States Patent
Webster et al.

(10) Patent No.: US 10,480,979 B2
(45) Date of Patent: Nov. 19, 2019

(54) FLOW METERS, FLOW METER CARTRIDGES, AND RELATED METHODS

(71) Applicant: Agilent Technologies, Inc., Santa Clara, CA (US)

(72) Inventors: Gregory Webster, Wilmington, DE (US); Joseph B. Bush, Kennett Square, PA (US)

(73) Assignee: Agilent Technologies, Inc., Santa Clara, CA (US)

( * ) Notice: Subject to any disclaimer, the term of this patent is extended or adjusted under 35 U.S.C. 154(b) by 414 days.

(21) Appl. No.: 15/164,604

(22) Filed: May 25, 2016

(65) Prior Publication Data
US 2017/0343405 A1    Nov. 30, 2017

(51) Int. Cl.
| | |
|---|---|
| *G01F 3/20* | (2006.01) |
| *G01F 5/00* | (2006.01) |
| *G01F 25/00* | (2006.01) |
| *G01F 3/22* | (2006.01) |
| G01F 15/00 | (2006.01) |
| G01F 15/14 | (2006.01) |
| G01F 15/16 | (2006.01) |

(52) U.S. Cl.
CPC ............... *G01F 3/20* (2013.01); *G01F 3/226* (2013.01); *G01F 5/00* (2013.01); *G01F 25/0007* (2013.01); *G01F 3/221* (2013.01); *G01F 3/223* (2013.01); *G01F 3/225* (2013.01); *G01F 3/227* (2013.01); *G01F 15/005* (2013.01); *G01F 15/14* (2013.01); *G01F 15/16* (2013.01)

(58) Field of Classification Search
CPC .................................. G01F 3/20; G01F 5/00
See application file for complete search history.

(56) References Cited

U.S. PATENT DOCUMENTS

| | | |
|---|---|---|
| D215,562 S | 10/1969 | Sato |
| 3,925,692 A | 12/1975 | Leschek et al. |
| 4,303,376 A | 12/1981 | Siekmann |
| 4,487,062 A | 12/1984 | Olin et al. |
| 4,800,754 A | 1/1989 | Korpi |
| 4,979,641 A | 12/1990 | Turner |
| 5,022,557 A | 6/1991 | Turner |

(Continued)

FOREIGN PATENT DOCUMENTS

| | | |
|---|---|---|
| DE | 4319562 A1 | 2/1995 |
| GB | 2353353 A | 2/2001 |
| JP | 2007086033 A | 4/2007 |

OTHER PUBLICATIONS

International Search Report and Written Opinion dated Jun. 13, 2017 from related International Application No. PCT/US2017/023219.

(Continued)

*Primary Examiner* — John Fitzgerald

(57) ABSTRACT

A flow meter for measuring a flow rate of a fluid may include a cartridge containing certain components such as a flow sensor. The cartridge is removable from the flow meter such that it may be replaced with a new cartridge, allowing calibration of the flow meter while enabling the flow meter to continue to be operated with another cartridge in the place of the removed cartridge. The flow meter may be configured to direct fluid flow away from selected components of the flow meter.

20 Claims, 24 Drawing Sheets

(56) References Cited

U.S. PATENT DOCUMENTS

| | | | |
|---|---|---|---|
| 5,277,196 A * | 1/1994 | Hankinson | A61B 5/087 600/537 |
| 5,297,427 A | 3/1994 | Shambayati | |
| 5,447,073 A | 9/1995 | Kalinoski | |
| 5,460,038 A | 10/1995 | Woodward | |
| 5,463,906 A | 11/1995 | Spani et al. | |
| 5,511,416 A | 4/1996 | Shambayati | |
| 5,526,674 A | 6/1996 | Korpi | |
| 5,684,246 A | 11/1997 | Korpi | |
| 5,723,783 A | 3/1998 | Woodward | |
| 5,729,207 A * | 3/1998 | Yamano | G01N 33/0067 340/628 |
| 5,780,736 A | 7/1998 | Russell | |
| 5,993,743 A * | 11/1999 | Nordman | G01N 1/2252 250/339.13 |
| 6,581,458 B1 * | 6/2003 | Hathaway | G01F 1/08 73/238 |
| 6,883,364 B2 * | 4/2005 | Sunshine | G01N 33/0009 73/23.34 |
| 7,143,645 B2 * | 12/2006 | Benson | G01F 3/12 73/238 |
| 7,415,892 B2 * | 8/2008 | Lam | G01F 1/58 73/861.15 |
| 7,420,659 B1 * | 9/2008 | Cabuz | A61B 5/150969 356/39 |
| 7,553,453 B2 * | 6/2009 | Gu | B01L 3/502715 422/537 |
| 7,729,869 B2 * | 6/2010 | Brown | G01F 1/075 62/127 |
| 7,845,239 B1 | 12/2010 | Lam | |
| 7,880,641 B2 * | 2/2011 | Parris | G01D 4/002 137/625.11 |
| 8,048,022 B2 | 11/2011 | Moy et al. | |
| 8,262,992 B2 | 9/2012 | Kontschieder et al. | |
| 8,323,564 B2 * | 12/2012 | Padmanabhan | B01L 3/502715 422/502 |
| 8,342,018 B2 * | 1/2013 | Huang | G01F 1/6845 73/204.26 |
| 8,438,933 B2 | 5/2013 | Grove et al. | |
| 8,616,048 B2 * | 12/2013 | Ayliffe | B01L 3/502715 324/71.1 |
| 8,828,320 B2 * | 9/2014 | Bardell | G01N 35/00603 422/68.1 |
| 9,180,451 B2 * | 11/2015 | Ziglioli | B01L 3/502715 |
| 9,702,840 B2 * | 7/2017 | Palazzotto | G01N 27/223 |
| 2002/0178789 A1 * | 12/2002 | Sunshine | G01N 29/022 73/31.06 |
| 2004/0069046 A1 * | 4/2004 | Sunshine | G01N 33/0009 73/23.34 |
| 2007/0213605 A1 * | 9/2007 | Brown | A61B 5/150854 600/300 |
| 2008/0195020 A1 | 8/2008 | Cabuz et al. | |
| 2010/0199788 A1 * | 8/2010 | Ayliffe | B01L 3/0275 73/864.11 |
| 2010/0300213 A1 | 12/2010 | Fink et al. | |
| 2011/0011185 A1 * | 1/2011 | Grove | G01F 1/36 73/861.18 |
| 2012/0024054 A1 * | 2/2012 | Huang | G01F 1/6845 73/204.26 |
| 2013/0124131 A1 | 5/2013 | Murakami | |
| 2014/0034668 A1 * | 2/2014 | Carbone, II | G01F 3/10 222/40 |
| 2014/0109644 A1 * | 4/2014 | Carbone, II | G01F 25/0007 73/1.16 |
| 2015/0073392 A2 * | 3/2015 | Lee | G01F 1/6847 604/533 |
| 2015/0273144 A1 * | 10/2015 | Lee | A61M 5/16886 73/204.11 |
| 2015/0283544 A1 * | 10/2015 | Chan | B01L 3/50273 73/53.01 |
| 2018/0177945 A1 * | 6/2018 | Sims | A61M 5/14 |

OTHER PUBLICATIONS

Agilent Flowmeter ADM1000; Operating Instructions; Agilent Technologies, Inc., Third edition, Jun. 2003.

Agilent Flowmeter ADM2000; Operating Instructions; Agilent Technologies Inc., Third edition, Jun. 2003.

Restek's ProFLOW 6000 Electronic Flowmeter; Users Manual Version 5.6 for cat.#22656; Restek; Apr. 2014.

* cited by examiner

FLOW METERS, FLOW METER CARTRIDGES, AND RELATED METHODS

TECHNICAL FIELD

The present invention generally relates to flow meters that measure the flow rate of a fluid flowing through a fluid line such as tubing. In one aspect, the invention relates to a flow meter in which a cartridge containing certain components of the flow meter is replaceable. In another aspect, the invention relates to a flow meter that directs fluid flow away from selected components of the flow meter.

BACKGROUND

Various flow meters are available for use in measuring the flow rate of a fluid flowing through a fluid line. The operation of different types of flow meter are based on different techniques of flow measurement. An example of one type of flow meter is the displacement flow meter. The displacement flow meter measures fluid flow by measuring the displacement of a movable boundary, such as a piston or a diaphragm, which moves in response to the fluid flow. The movable boundary in part defines a chamber into which the fluid flows. By closing a valve in the fluid flow path with which the chamber communicates, flow through the chamber is temporarily confined such that the fluid accumulates in the chamber, resulting in an increase in the volume of the fluid in the chamber. As its volume increases, the fluid moves (displaces) the movable boundary. The increase in fluid volume in the chamber, and the attendant displacement of the movable boundary, can be correlated to the flow rate of the fluid. The displacement flow meter includes a transducer or sensor configured to measure the displacement of the movable boundary and generate an electrical signal representative of the amount or rate of displacement. The flow measurement signal is processed by appropriate electronics to calculate the fluid flow rate.

The displacement flow meter is advantageous in that its ability to measure fluid flow, and the accuracy of such measurement, are largely insensitive to the physical parameters of the fluid being measured such as fluid composition, viscosity, temperature, density, compressibility, etc. One example for which flow measurement independent of or unaffected by fluid parameters is advantageous is fluid flow through a fluid line of a chromatography instrument. The fluid flowing through a chromatographic conduit is typically a mixture of different components, the composition of which can vary significantly over time. Within the class of displacement flow meters are those utilizing an acoustic displacement transducer (ADT) as the flow sensor. The ADT utilizes a compliant diaphragm as the movable boundary, which may be similar to the diaphragm of an audio loudspeaker. An electromagnetic coil is mounted so as to move with the diaphragm. Movement of the coil in a static magnetic field induces a current in the coil that is utilized as the flow measurement signal. Examples of ADT-based flow meters are described in U.S. Pat. Nos. 5,460,038 and 5,540,104, the contents of which are incorporated herein by reference.

As with many types of measurement instruments, the calibration of a flow meter drifts over time with continued use of the flow meter. Thus, a flow meter needs to be recalibrated periodically. Recalibration of a handheld flow meter typically requires that the user return the entire flow meter to the manufacturer or other service provider having the expertise needed for performing the recalibration. The act of returning the flow meter is disruptive to the user, as the flow meter is unavailable for use during this time. For a remote user such as a user located in a different country, the downtime required to ship the flow meter to the manufacturer, perform the calibration, and ship the flow meter back to the user can span several weeks and the shipping costs can be high. Therefore, it would be desirable to provide a flow meter that enables replacement of components, calibration or other modification to be performed in an easier and more efficient manner, and which preferably eliminates the need to return the flow meter to the manufacturer or other entity remote from the user.

Certain components of the flow meter, such as sensitive electronic components, may be adversely affected by exposure to the fluid being measured by the flow meter. Moreover, certain types of fluid that may be measured may react to heat or electromagnetic energy emitted by electronic components in an adverse way. Therefore, it would also be desirable to provide a flow meter that directs fluid flow away from certain electronic components and/or other components of the flow meter, or otherwise isolate such components from the fluid.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a cartridge for a flow meter includes: a cartridge housing enclosing a cartridge interior, and configured for removable installation in a mainframe of a flow meter; a fluid inlet configured for conducting fluid from outside the cartridge housing to the cartridge interior; a chamber disposed in the cartridge interior; a chamber inlet communicating with the chamber; a flow sensor disposed in the cartridge interior and configured for measuring fluid flow rate into the chamber; and a fluid outlet, wherein the cartridge defines a flow path through the fluid inlet, through the chamber inlet, to the chamber, and toward the fluid outlet.

According to another embodiment, a flow meter includes: a cartridge according to any of the embodiments disclosed herein; and a mainframe comprising a receptacle configured for receiving the cartridge, wherein the cartridge is movable through the receptacle between an uninstalled position at which the cartridge is unengaged with the mainframe, and an installed position at which the cartridge is engaged with the mainframe.

In some embodiments, the cartridge includes a first engagement member configured for removably coupling with a second engagement member of the mainframe.

In some embodiments, the cartridge includes a chamber outlet separate from the chamber inlet.

In some embodiments, the fluid outlet of the cartridge is positioned to direct fluid from the cartridge interior into the receptacle or to a location outside of the cartridge and outside of the receptacle.

According to another embodiment, a method for operating a flow meter includes: installing a cartridge in a mainframe of the flow meter by moving the cartridge into a receptacle of the mainframe, wherein the cartridge comprises a cartridge interior, a chamber in the cartridge interior, a chamber inlet, and a flow sensor; flowing a fluid through the chamber inlet and into the chamber; while flowing the fluid, operating the flow sensor to measure a flow rate of the fluid into the chamber, wherein the flow sensor outputs a measurement signal; and transmitting the measurement signal to an electronic circuit disposed in the mainframe via the first electrical connector and the second electrical connector.

According to another embodiment, a flow meter includes: a housing enclosing a housing interior; a chamber disposed in the housing interior; a chamber inlet communicating with the chamber; a chamber outlet communicating with the chamber; a flow sensor configured for measuring fluid flow rate into the chamber; and a fluid outlet communicating with an area outside of the housing, wherein the housing defines a flow path through the chamber inlet, the chamber, and the chamber outlet, and to the fluid outlet.

According to another embodiment, a method for operating a flow meter includes: flowing a fluid into a housing of the flow meter, the housing comprising a housing interior and the flow meter comprising a chamber in the housing interior, a chamber inlet, a chamber outlet, and a flow sensor; flowing the fluid through the chamber inlet, the chamber, and the chamber outlet; while flowing the fluid, operating the flow sensor to measure a flow rate of the fluid into the chamber, wherein the flow sensor outputs a measurement signal; and transmitting the measurement signal to an electronic circuit of the flow meter.

According to another embodiment, a flow meter is configured for performing any of the methods disclosed herein.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
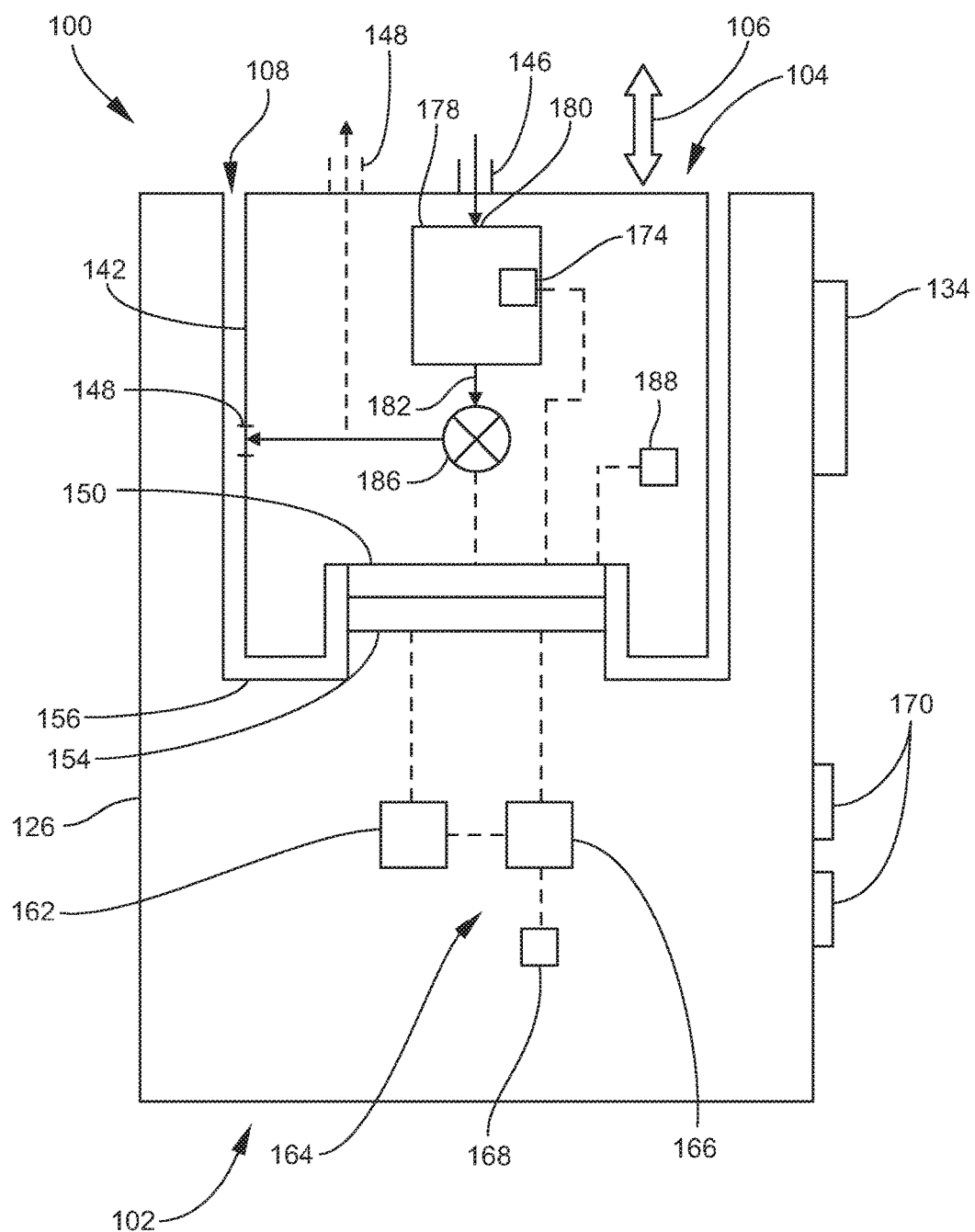
FIG. 1 is a schematic view of an example of a fluid flow meter according to some embodiments.

FIG. 1 is a schematic view of an example of a fluid flow meter 100 according to some embodiments. In some embodiments, the flow meter 100 may generally be configured to measure the flow rate of any type of fluid, regardless of composition, viscosity, density, etc. For example, the flow meter 100 may utilize a fluid flow rate sensor capable of measuring, with an acceptable level of accuracy, flow rate independently of composition, viscosity, density, etc. In embodiments described herein by example, the flow meter 100 is configured to measure the flow rate of gases of any composition. One particular, yet non-limiting, application is the measurement of gases of the type encountered in gas chromatography.

In the illustrated example, the flow meter 100 has a modular configuration. Specifically, the flow meter 100 may include a flow meter mainframe 102 and a flow meter cartridge 104 configured for removable installation in the mainframe 102. FIG. 1 illustrates the cartridge 104 in an installed, operational position in the mainframe 102. The cartridge 104 is movable between the installed position and an uninstalled position, as indicated by an arrow 106. For this purpose, the mainframe 102 may include a receptacle 108 (e.g., slot, bay, etc.) configured (sized, shaped, structured, etc.) for receiving the cartridge 104. As described below, the mainframe 102 may include one or more internal mainframe components and the cartridge 104 may include one or more internal cartridge components. The modular configuration of the flow meter 100 enables the (first) cartridge 104 to be replaced with a new (second) cartridge, in effect enabling the internal cartridge components of the first cartridge 104 to be replaced with the new internal cartridge components of the second cartridge. In some embodiments the components selected to be replaceable, i.e., selected for inclusion in the cartridge 104 instead of in the mainframe 102, may include components that affect the calibration or instrument drift of the flow meter 100. Examples of such components include, but are not limited to, a flow sensor, a valve, and a memory containing calibration data, as described further below. Thus, the flow meter 100 may be recalibrated by replacing the existing cartridge 104 with a new cartridge. A minimum number of components may be selected for inclusion in the cartridge 104 so as to minimize the cost of the cartridge 104 and thereby increase the desirability of replacing the cartridge 104 at the appropriate time.

In some embodiments, the cartridge 104 may be considered to be disposable. The cartridge 104 need not be disassembled and serviced, but rather discarded in favor of a new cartridge. Alternatively, the cartridge 104 may be removed from the mainframe 102 to enable one or more of the cartridge components to be serviced or replaced. In this case, the "new" or "second" cartridge may be the same cartridge 104 that was previously removed from the mainframe 102. As a further alternative, the new or second cartridge may be different in some manner from the first cartridge 104 being replaced. For example, the first cartridge 104 may be optimized or adapted for gas flow while the second cartridge is optimized or adapted for liquid flow. As another example, different cartridges may contain different calibration data to accommodate the measurement of different fluids.

The mainframe 102 and the cartridge 104 may be configured such that the cartridge 104 is retained in the mainframe 102 (in the receptacle 108) in a secured or locked, yet removable or releasable, manner at the installed position. That is, the cartridge 104 may engage the mainframe 102 at the installed position in a manner in which, after installation, the cartridge 104 is not removable (or at least not easily removable) without some action being taken to disengage the cartridge 104 from the mainframe 102 (e.g., from the receptacle 108). For this purpose, the cartridge 104 may include one or more first engagement members (not shown) configured for removably engaging or coupling with one or more second engagement members (not shown) of the mainframe 102. The cartridge 104 may be installed in the mainframe 102 by moving or sliding the cartridge 104 into and through the receptacle 108 until the first engagement member engages the second engagement member. The cartridge 104 may thereafter be uninstalled (removed) from the mainframe 102 by disengaging the first engagement member from the second engagement member and moving the cartridge 104 out from the receptacle 108.

The cartridge 104 may generally include a cartridge housing 142. The cartridge 104 or the cartridge housing 142 may also be referred to as a sensing housing. The cartridge housing 142 may generally include one or more cartridge housing walls that at least partially enclose a cartridge interior. The cartridge 104 may include one or more cartridge components disposed in the cartridge interior and/or mounted to the cartridge housing 142, examples of which are described below. The cartridge 104 may further include a fluid inlet (or cartridge inlet) 146 that includes an opening formed through an outer cartridge wall, thereby providing a fluid flow path from a point external to the cartridge 104 into the cartridge interior. The fluid inlet 146 may be configured as a port (or fluid fitting) configured for coupling with fluidics external to the flow meter 100 such as, for example, a conduit (e.g., a tube, channel, passage, etc.). In some embodiments, the fluid inlet 146 may be or include a barbed or Luer-type fitting (not shown), as appreciated by persons skilled in the art. The cartridge 104 may further include a fluid outlet (or cartridge outlet) 148 formed through an outer cartridge wall, thereby providing a fluid flow path from the cartridge interior (or from a fluidic component therein) to a point external to the cartridge 104. The fluid outlet 148 may be located such that fluid is discharged from the cartridge 104 into the receptacle 108 at a point surrounded by the mainframe 102. Alternatively, as indicated by a dashed-line arrow, the fluid outlet 148 may be located such that fluid is discharged from the cartridge 104 directly to a point outside of the flow meter 100 including outside of the receptacle 108. For example, the fluid outlet 148 and the fluid inlet 146 may both be located on a side of the cartridge 104 directly exposed to the outside, i.e., at a point not surrounded or enclosed by the mainframe 102. In some embodiments, the fluid outlet 148 may be a vent communicating with the cartridge interior and with the ambient, i.e., the open environment surrounding the flow meter 100. In other embodiments, the fluid outlet 148 may be a port (or fluid fitting) configured to be connected to a fluidic component outside the flow meter 100 such as, for example, a conduit.

Generally, the cartridge 104 defines (or establishes or forms) a fluid flow path from the fluid inlet 146, through the cartridge interior (including through one or more cartridge components disposed in the cartridge interior, as described below), and to the fluid outlet 148. In some embodiments, the fluid outlet 148 (as either a vent or a port) may be in open communication with a space in the cartridge interior, i.e., with a portion of the cartridge interior not enclosed by an internal component disposed in the cartridge interior. In this case, the cartridge interior (or at least some portion or space thereof) is part of the fluid flow path. In other embodiments, the fluid outlet 148 (as either a vent or a port) may be directly connected to an internal fluidic component (e.g., a conduit) disposed in the cartridge interior. For example, the fluid flow path through the cartridge 104 may be defined entirely by internal cartridge components that are located in the cartridge interior.

As also shown in FIG. 1, the cartridge 104 may include a cartridge (or first) electrical connector 150. The mainframe 102 may include a mainframe (or second) electrical connector 154 configured for removable coupling with the first electrical connector 150. The first electrical connector 150 is coupled to the second electrical connector 154 when the cartridge 104 is in the installed position, and is decoupled or uncoupled from the second electrical connector 154 when the cartridge 104 is in the uninstalled position. The optional locking or secured engagement between the mainframe 102 and the cartridge 104 described herein may generally coincide with the coupling engagement between the first electrical connector 150 and the second electrical connector 154.

In some embodiments, coupling engagement between the first electrical connector 150 and the second electrical connector 154 may itself serve as a secure engaging means between the mainframe 102 and the cartridge 104. The second electrical connector 154 may be positioned at or proximate to the receptacle 108. Depending on the embodiment, "at or proximate to" may mean that the second electrical connector 154 is positioned outside of but proximate to the receptacle 108, or that the second electrical connector 154 extends into the receptacle 108.

Generally, the first electrical connector 150 and the second electrical connector 154 may have any configuration suitable for providing an electrical interconnection when coupled together. As one non-limiting example, the first electrical connector 150 and the second electrical connector 154 may have plug-and-socket configuration in which one of the first electrical connector 150 and the second electrical connector 154 provides "male" electrical contacts and the other provides corresponding "female" electrical contacts. The first electrical connector 150 and the second electrical connector 154 may communicate with various cartridge components and mainframe components, examples of which are described below. The first electrical connector 150 and the second electrical connector 154 may be respectively mounted in the cartridge 104 and the mainframe 102 in any suitable manner. For example, the first electrical connector 150 and the second electrical connector 154 may be mounted to (or at least communicate with electronic components of) circuit boards (e.g., printed circuit assemblies (PCAs) or printed circuit boards (PCBs)) respectively provided in the cartridge 104 and the mainframe 102. When coupled together, the first electrical connector 150 and the second electrical connector 154 may provide one or more independent electrical interconnections or channels that enable transmission of various types of electrical signals, such as for example control signals, measurement signals (data), power signals, etc., as appreciated by persons skilled in the art.

The mainframe 102 may generally include a mainframe (or main) housing 126. The main housing 126 may generally include one or more mainframe walls that enclose a mainframe interior. The mainframe 102 may include one or more mainframe components disposed in the mainframe interior and/or mounted to the main housing 126, examples of which are described below.

As also shown in FIG. 1, the mainframe 102 may include an interior wall 156 disposed between the receptacle 108 and the mainframe interior (e.g., the interior enclosed by the main housing 126). The interior wall 156 may serve as the base or floor of the receptacle 108. The second electrical connector 154 may be positioned at or proximate to the interior wall 156. Depending on the embodiment, "at or proximate to" may mean that the second electrical connector 154 extends through an opening of the interior wall 156 and into the receptacle 108, or is substantially flush with such opening, or is proximate to such opening but outside of the receptacle 108. The interior wall 156 may partition, or provide a boundary between, the receptacle 108 and the mainframe interior. Depending on the spacing between the interior wall 156 and the second electrical connector 154 and other structures of the mainframe 102, this boundary may or may not be fluid-tight. For example, in some embodiments the interior wall 156 may be configured to provide a gas conductance-limiting barrier, but not necessarily a fluid-tight seal. In other embodiments the interior wall 156 may be configured to provide a fluid-tight seal. For example, sealing components (e.g., gaskets or the like) may be provided at the interfaces between the interior wall 156 and the second electrical connector 154 and other structures of the mainframe 102.

As further shown in FIG. 1, the mainframe components may include, in addition to the second electrical connector 154, a display screen 134 (schematically shown on a side of the main housing 126 passing through the plane of the drawing sheet) configured to display information to the user, an electrical power source 162 (e.g., one or more batteries and/or a power connector such as a universal serial bus (USB) port), an electronic circuit 164, and one or more user-operated buttons 170. One or more of such mainframe components may be mounted to or at least communicate with one or more circuit boards (not shown), as appreciated by persons skilled in the art. The display screen 134 may be any type such as, for example, a liquid crystal display (LCD). The display screen 134 may be mounted at the mainframe 102 in any manner resulting in the display screen 134 being visible to the user from a vantage point external to the flow meter 100. The electronic circuit 164 may include one or more electronic components (hardware, firmware, etc.) as needed for carrying out various electronic functions of the flow meter 100. For example, the electronic circuit 164 may include one or more electronic processors or controllers such as a main processor 166 and one or more memories 168. The main processor 166 may be configured to perform various functions such as, for example, controlling or coordinating the functions of other components of the flow meter 100 (such as by outputting appropriate control signals), receiving commands from one or more user-operated buttons 170 provided on the flow meter 100, sending signals to the display screen 134 to enable the display of information, acquiring fluid flow rate data, transmitting data to the memory 168 for storage, etc. The acquisition of flow rate data may entail, for example, receiving flow measurement signals and calibration data from the cartridge 104, calculating fluid flow rate based on the flow measurement signals and calibration data, etc. The circuit board(s) provided in the mainframe 102 may be configured as needed for providing signal communication between the second electrical connector 154 and various electronic components (e.g., the electrical power source 162, electronic circuit 164, etc.).

It will be understood that FIG. 1 illustrates merely one example of a general configuration of mainframe components that may be included in the mainframe 102, and that many other configurations are possible. The particular types of mainframe components included, and their arrangement or layout in the mainframe 102, may vary from one embodiment to another. Moreover, the mainframe components may be of the type generally known to persons skilled in the art, and thus their structures, functions, and operations need not be described in detail herein.

As described above, the cartridge 104 is configured to be removably installable in the mainframe 102, such as by being alternately movable into and out from the receptacle 108 as indicated by the arrow 106. The cartridge 104 is also configured to sense the flow rate of a fluid. For this purpose, the cartridge 104 defines (provides, establishes) a fluid flow path from the fluid inlet 146, through the cartridge interior, and to the fluid outlet 148 leading out from the cartridge interior. In addition, the cartridge 104 includes a fluid flow sensor 174 (or flow rate sensor) configured to sense the flow rate of a fluid flowing along the flow path. In the present embodiment, the cartridge 104 includes a sensing chamber 178 that is part of the fluid flow path in the cartridge interior. Thus the chamber 178 is located between, and communicates with, the fluid inlet 146 and the fluid outlet 148. Generally, the chamber 178 may be any part of the flow path in the cartridge 104 that serves as a sensing volume or zone with which the flow sensor 174 can interact to sense the flow rate of fluid flowing into the cartridge 104 via the fluid inlet 146. The chamber 178 is configured (structured) to at least partially define a chamber interior that is distinct from the rest of the cartridge interior. For example, the chamber 178 may include one or more chamber walls.

In the present embodiment, the cartridge 104 (or the chamber 178) includes a chamber inlet 180 and a chamber outlet 182, both internal to the cartridge 104 and upstream of the fluid outlet 148. The chamber 178 (or chamber interior) is thus located between, and communicates with, the chamber inlet 180 and the chamber outlet 182. The chamber inlet 180 communicates with the fluid inlet 146. The chamber inlet 180 and the fluid inlet 146 may be part of the same structure. For example, the chamber inlet 180 and the fluid inlet 146 may both be defined by the cartridge housing 142. In some embodiments, the chamber inlet 180 and the fluid inlet 146 may be considered to be a single fluidic structure or component. Alternatively, the chamber inlet 180 and the fluid inlet 146 may be different structures. For example, the fluid inlet 146 may be a fitting or the like that is coupled to the cartridge housing 142 so as to place the fluid inlet 146 in fluid communication with the chamber inlet 180. In some embodiments, a conduit or passage interconnects the fluid inlet 146 with the chamber inlet 180. In some embodiments, the interconnecting conduit or passage may be or include a flow restrictor such as, for example, an orifice plate presenting a reduced flow area (orifice). In all such embodiments, the fluid flow path runs from the fluid inlet 146 and through the chamber inlet 180, the chamber 178, and the chamber outlet 182 (or from a single-piece fluid inlet/chamber inlet 146/180 and through the chamber inlet 180, the chamber 178, and the chamber outlet 182). The fluid flow path through the cartridge 104 is generally depicted by solid-line arrows in FIG. 1.

Generally, the flow sensor 174 may be any device operable as a transducer to convert a fluid flow rate sensed in the chamber 178 into an electrical output signal (flow measurement signal) that can be processed to generate a user-interpretable readout indicative of fluid flow rate. Generally, the chamber 178 may have any geometry suitable for the operation of the flow sensor 174. For example, the chamber 178 may be a conduit or section of a conduit of a desired length, width, volume, etc.

In some embodiments, the flow sensor 174 is a displacement flow sensor that senses displacement of a movable (e.g., translatable or deflectable) boundary in response to fluid flow into the chamber 178. When so configured, the cartridge 104 may include a valve 186 positioned in the flow path downstream from the chamber 178, i.e., between the chamber outlet 182 and the fluid outlet 148. The valve 186 may be switchable between an open state and a closed state. In the open state, the valve 186 is open and fluid is free to flow from the fluid inlet 146, through the chamber inlet 180, through the chamber 178, through the chamber outlet 182, through the valve 186, through the fluid outlet 148, and into the receptacle 108 or directly into the ambient (depending on the embodiment, as described herein). In the open state, no displacement of the movable boundary occurs in the chamber 178 and hence no fluid flow sensing occurs (or no change in a measurement signal outputted by the flow sensor 174 occurs). In the closed state, the valve 186 is closed and thus blocks fluid from flowing through the valve 186. Consequently, the fluid flowing through the fluid inlet 146 and the chamber inlet 180 (or through a single-piece fluid inlet/chamber inlet 146/180) accumulates in the chamber 178, causing the movable boundary of the chamber 178 to move. The valve 186 may be configured to be normally open, and preferably has a low dead-volume design. The flow sensor 174 may be configured to sense the movement of the movable boundary, and output an electrical signal proportional to such movement. This outputted measurement signal may be processed as needed (e.g., by the electronic circuit 164 of the mainframe 102) to calculate fluid flow rate through or into the chamber 178. As one non-limiting example, the flow sensor 174 may be an acoustic displacement transducer (ADT) that includes a movable or deflectable boundary defining a boundary of the chamber 178 (facing the chamber interior), as described further herein and in references such as the above-referenced U.S. Pat. Nos. 5,460,038 and 5,540,104, and as generally appreciated by persons skilled in the art. In such embodiments, as the valve 186 operates in conjunction with the movable boundary to acquire a measurement signal, the valve 186 may be considered as being part of or a component of the flow sensor 174.

As schematically depicted by dashed lines in FIG. 1, the electronic circuit 164 in the mainframe 102 may control the operation of the flow sensor 174 and the valve 186, and may receive measurement signals from the flow sensor 174, via the electrical interconnection established by the coupling of the first electrical connector 150 and the second electrical connector 154. Moreover the flow sensor 174 and the valve 186, if they are active (power consuming) devices, may receive power signals from the power source 162 in the mainframe 102 via the electrical interconnection established by the coupling of the first electrical connector 150 and the second electrical connector 154.

As further shown in FIG. 1, the cartridge components may include one or more memories 188 such as, for example, electrically erasable programmable read-only memory (EE-PROM), flash memory, etc. In some embodiments, the memory 188 may contain calibration data (e.g., look-up tables). Calculation of flow rate may be based on actual measurement signals outputted from the flow sensor 174 that are modified as appropriate by the calibration data, as appreciated by persons skilled in the art. The calibration data stored in the memory 188 in the cartridge 104 may be accessed by the electronic circuit 164 in the mainframe 102 via the electrical interconnection established by the coupling of the first electrical connector 150 and the second electrical connector 154, as schematically depicted by dashed lines in FIG. 1. Internal cartridge components such as one or more of the first electrical connector 150, the flow sensor 174, the valve 186, and the memory 188 may be mounted to or at least communicate with a circuit board (not shown) disposed in the cartridge 104.

From the foregoing it is evident that components of the flow meter 100 affecting the calibration thereof and/or subject to instrument drift, such as the flow sensor 174, the valve 186, and the calibration data-containing memory 188, may be located in the replaceable cartridge 104 instead of in the mainframe 102. By this configuration, the user of the flow meter 100 can periodically effect calibration (or recalibration) of the flow meter 100 simply by replacing the cartridge 104 with a new cartridge without any appreciable downtime of the flow meter 100. Accordingly, disassembly of the flow meter 100 to replace or recalibrate individual components thereof is avoided.

FIGS. 2A to 8 illustrate an example of a fluid flow meter 200 according to another embodiment in which the flow meter 200 has a modular or cartridge-based configuration.

Figure 2A:
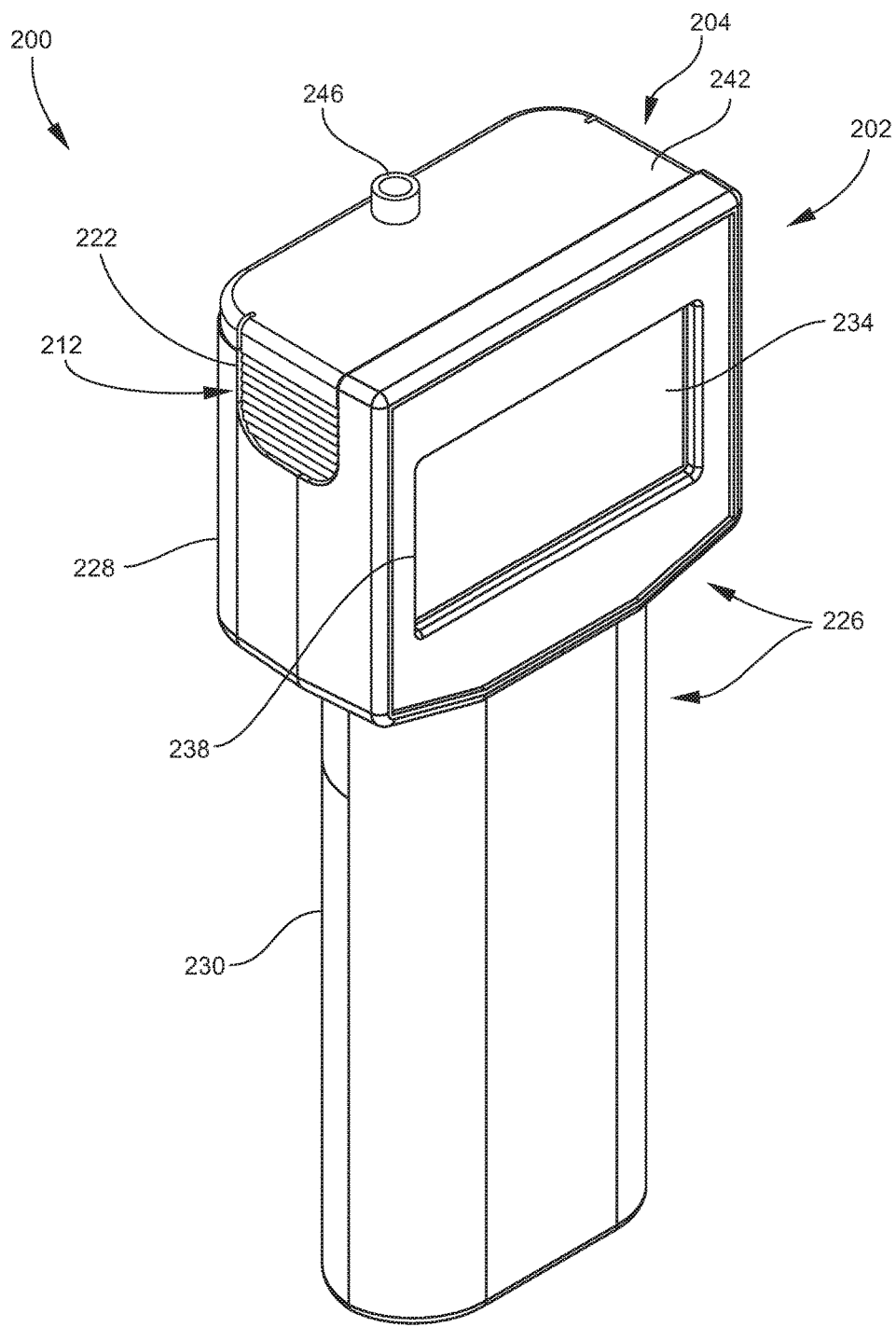
FIG. 2A is a front perspective view of an example of a fluid flow meter according to another embodiment, illustrating a cartridge of the fluid flow meter an installed, operational position in a mainframe of the fluid flow meter.
Figure 2B:
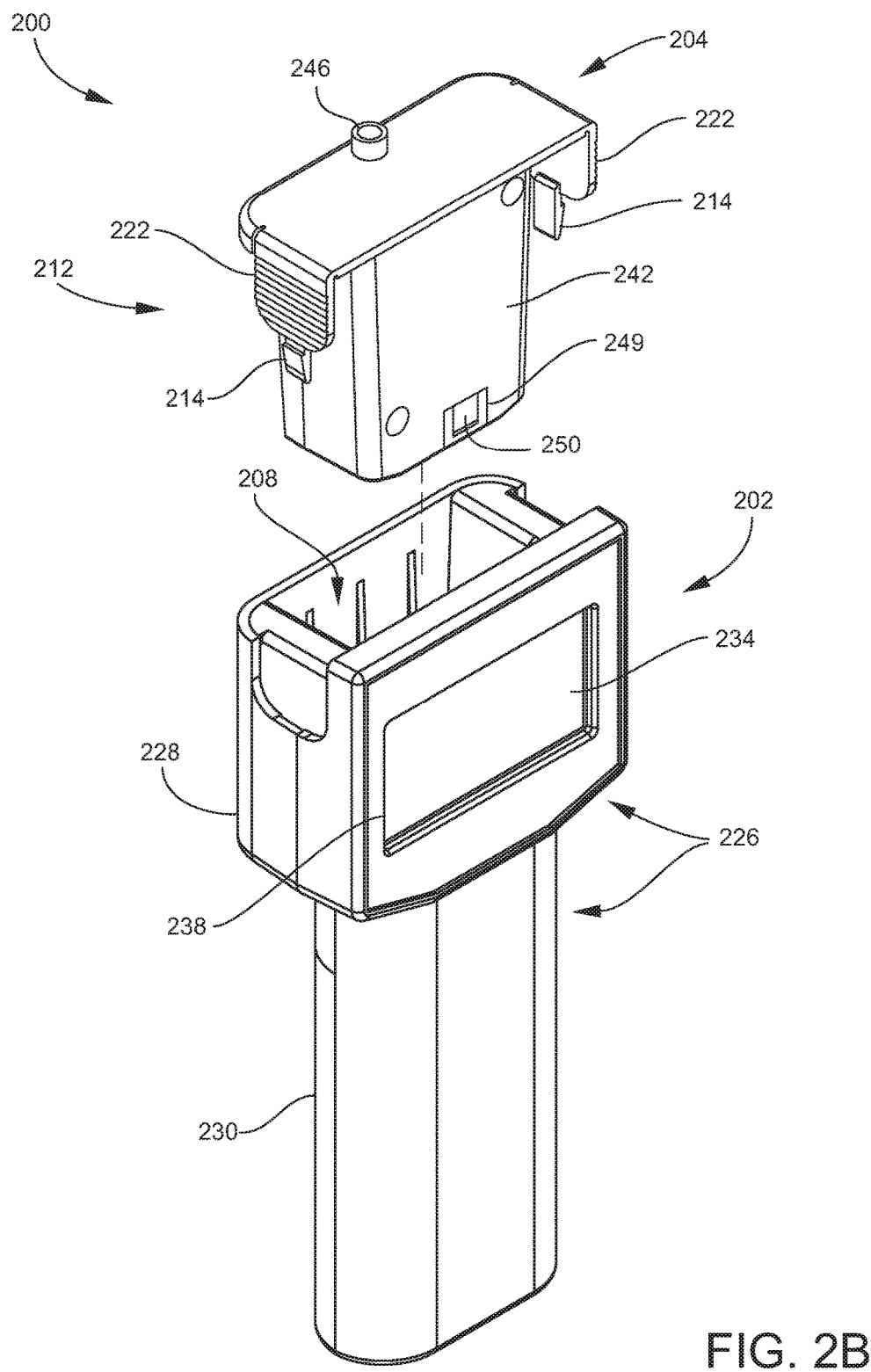
FIG. 2B is another front perspective view of the fluid flow meter illustrated in FIG. 2A, showing the cartridge uninstalled (removed) from the mainframe.

FIG. 2A is a front perspective view of the fluid flow meter 200. The flow meter 200 includes a flow meter mainframe 202 and a flow meter cartridge 204 configured for removable installation in the mainframe 202. FIG. 2A illustrates the cartridge 204 in an installed, operational position in the mainframe 202. FIG. 2B is another front perspective view of the fluid flow meter 200, showing the cartridge 204 uninstalled (removed) from the mainframe 202. That is, the cartridge 204 is movable between an installed position (FIG. 2A) and an uninstalled position (FIG. 2B) in which the cartridge 204 is physically separated from the mainframe 202. In the present embodiment, the mainframe 202 includes a receptacle 208 configured for receiving the cartridge 204. The cartridge 204 is movable through the receptacle 208 and into the installed position. As described elsewhere in the present disclosure, the modular configuration of the flow meter 200 enables the (first) cartridge 204 to be replaced with a new (second) cartridge, consequently enabling internal cartridge components of the first cartridge 204 to be replaced with new internal cartridge components of the second cartridge.

The mainframe 202 and the cartridge 204 may be configured such that the cartridge 204 is retained in the mainframe 202 (in the receptacle 208) in a secured or locked, yet removable or releasable, manner. For this purpose, the cartridge 204 may include one or more first engagement members 212 configured for removably engaging or coupling with one or more second engagement members (not shown) of the mainframe 202. The cartridge 204 is installed in the mainframe 202 by moving or sliding the cartridge 204 into and through the receptacle 208 until the first engagement member 212 engages the second engagement member. In the illustrated embodiment, the first engagement member 212 is deflectable and includes an upward-facing barb or shoulder 214 (FIG. 2B). The second engagement member may be a complementary, downward-facing barb or shoulder (not shown) inside the mainframe 202 such as may be formed on an inside surface of mainframe 202. In such embodiment, the cartridge 204 may be moved into and through the receptacle 208 until the shoulder 214 of the first engagement member 212 slides past and engages the shoulder of the second engagement member of the mainframe 202. At this installed position, the cartridge 204 is secured or locked in place in the receptacle 208 due to the engagement between downward-facing shoulder of the second engagement member and the upward-facing shoulder 214 of the first engagement member 212, whereby the cartridge 204 is prevented from moving back upward. The first engagement member 212 may also include a contact section 222 configured (i.e., sized and positioned) to be contacted by a user's finger or thumb. The user may press the contact section 222 to move or deflect the first engagement member 212 out of engagement with the second engagement member, thereby enabling the cartridge 204 to be uninstalled (removed) from the mainframe 202.

It will be understood that terms such as "upward" and "downward" are merely relative terms pertinent to the perspective of FIGS. 2A and 2B, and that the use of such terms is not intended to place any limitation on the orientation of the flow meter 200.

The mainframe 202 may generally include a mainframe (or main) housing 226. The main housing 226 may generally include one or more mainframe walls that enclose a mainframe interior. In the illustrated embodiment, the main housing 226 includes a first mainframe section 228 at least partially enclosing the receptacle 208, and a second mainframe section 230 enclosing a mainframe interior distinct from the receptacle 208. The second mainframe section 230 may be configured (i.e., sized and shaped) to facilitate holding the flow meter 200 in the hand of a user. The mainframe 202 may also include a display screen 234. The display screen 234 may be mounted at the mainframe 202 in any manner enabling the display screen 234 to be readily visible to the user. In the illustrated embodiment, the display screen 234 is disposed inside the main housing 226 and is visible through an opening 238 in the main housing 226. The mainframe 202 may also include user-operated buttons (not shown) as described herein.

The cartridge 204 may generally include a cartridge housing 242. The cartridge housing 242 may generally include one or more cartridge housing walls that at least partially enclose a cartridge interior. The cartridge 204 may further include a fluid inlet (or cartridge inlet) 246 that includes an opening formed through an outer cartridge wall. The fluid inlet 246 may be configured for coupling with a tube or other fluidic component as described herein. The cartridge 204 may further include a fluid outlet (or cartridge outlet, not shown) formed through an outer cartridge wall, thereby providing a fluid flow path from the cartridge interior to a point external to the cartridge 204 as described herein. As also shown in FIG. 2B, the cartridge 204 may include a cartridge (or first) electrical connector 250 and an opening 249 providing access to the first electrical connector 250.

Figure 3:
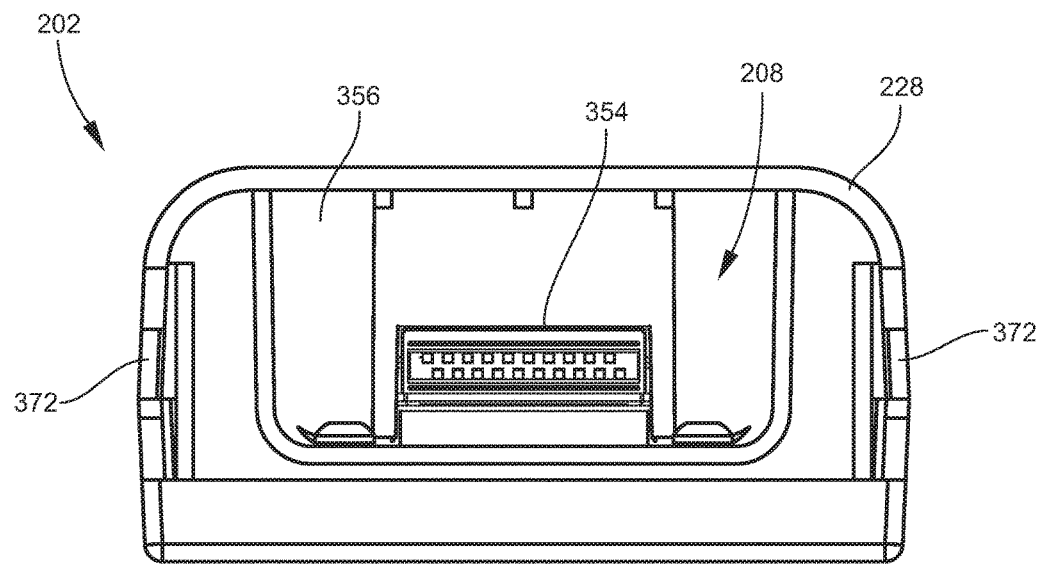
FIG. 3 is a top view of the mainframe illustrated in FIGS. 2A and 2B, without the cartridge installed therein, and looking down into a receptacle of the mainframe.

FIG. 3 is a top view of the mainframe 202 without the cartridge 204 installed therein, i.e., looking down into the receptacle 208. The mainframe 202 may include a mainframe (or second) electrical connector 354 configured for removable coupling with the first electrical connector 250 (FIG. 2B). The first electrical connector 250 is coupled to the second electrical connector 354 when the cartridge 204 is in the installed position (FIG. 2A), and is decoupled or uncoupled from the second electrical connector 354 when the cartridge 204 is in the uninstalled position (FIG. 2B). The second electrical connector 354 may be positioned at or proximate to the receptacle 208. Generally, the first electrical connector 250 and the second electrical connector 354 may have any configuration suitable for providing an electrical interconnection when coupled together, as described above in conjunction with FIG. 1.

As also shown in FIG. 3, the mainframe 202 may include an interior wall 356 disposed between the receptacle 208 and the mainframe interior (e.g., the interior enclosed by the second mainframe section 230 of the main housing 226, FIGS. 2A and 2B). The interior wall 356 may serve as the base or floor of the receptacle 208. The second electrical connector 354 may be positioned at or proximate to the interior wall 356. The interior wall 356 may partition or provide a boundary between the receptacle 208 and the mainframe interior. As described above, this boundary may or may not be fluid-tight. FIG. 3 also illustrates one or more spaces or openings 372 at the top of the mainframe 202, and on the inside of an outer wall of the first mainframe section 228 of the main housing 226 (FIGS. 2A and 2B). The first engagement member(s) 212 (FIG. 2B) of the cartridge 204 described above may be inserted into the space(s) 372 and into engagement with corresponding second engagement member(s) (not specifically shown) located in the space(s) 372.

Figure 4A:
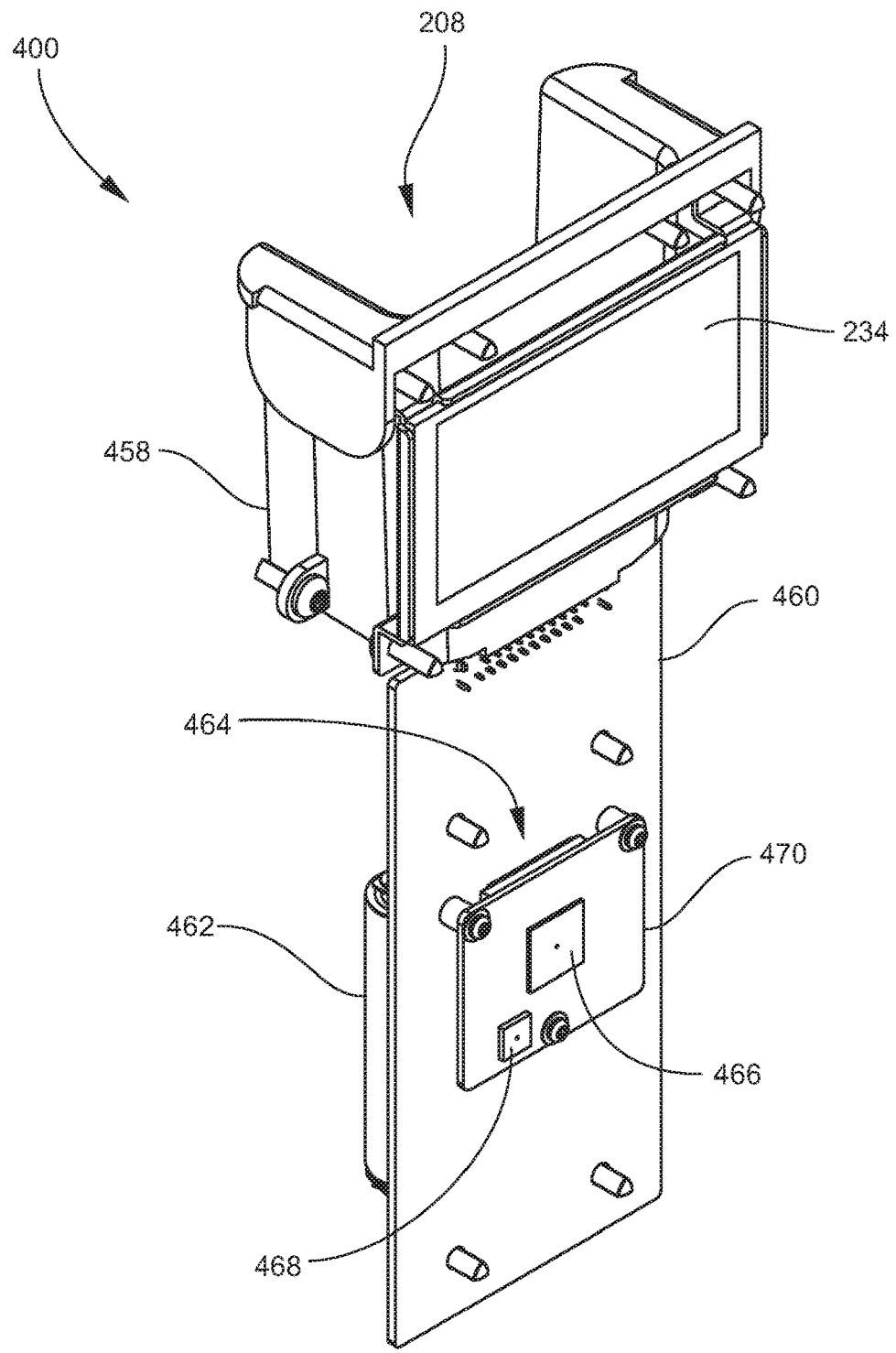
FIG. 4A is a front perspective view of an example of an internal assembly of mainframe components that may be included in a fluid flow meter according to some embodiments.
Figure 4B:
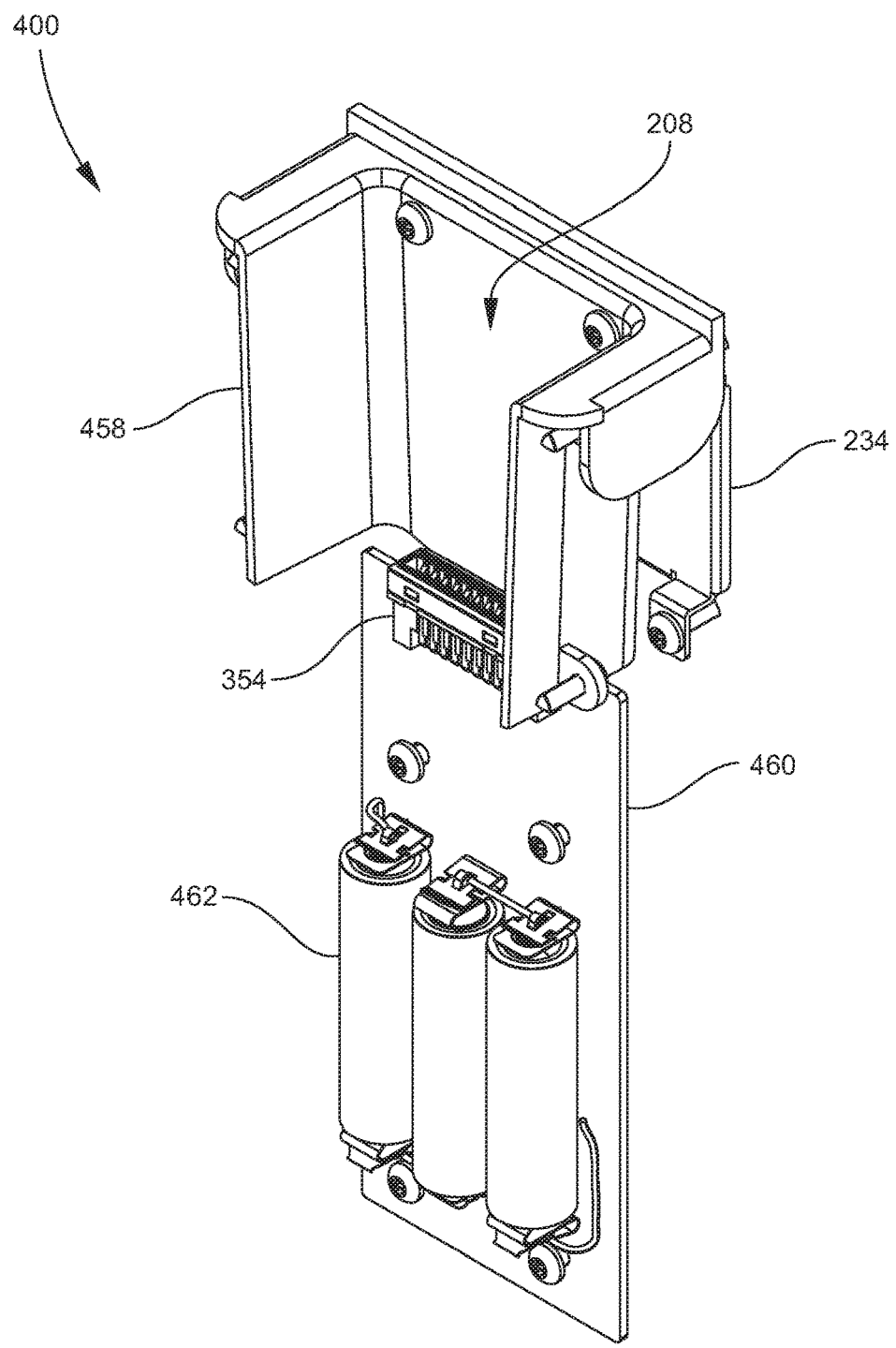
FIG. 4B is a rear perspective view of the internal assembly illustrated in FIG. 4A.

FIG. 4A is a front perspective view of an example of an internal assembly 400 of mainframe components that may be included in the mainframe 202 (e.g., enclosed by the mainframe housing 226, FIGS. 2A and 2B) according to some embodiments. FIG. 4B is a rear perspective view of the internal assembly 400. In the illustrated embodiment, the mainframe components may include the display screen 234 mounted to a support structure 458 (which may at least partially define the receptacle 208), the second electrical connector 354 mounted to or communicating with a main circuit board 460 (or main board, or first circuit board), an electrical power source 462 (e.g., one or more batteries as illustrated, and/or a power connection) mounted to or communicating with the main board 460, and an electronic circuit 464 mounted to or communicating with the main board 460. When batteries are utilized, the mainframe housing 226 may include an openable or removable access panel (not shown) to facilitate replacement of the batteries. As described above, the electronic circuit 464 may include one or more components for carrying out various electronic functions, such as a main processor 466, one or more memories 468, etc. The electronic circuit 464 may include or be formed on another circuit board-a control circuit board 470 (or control board, or second circuit board)—that is mounted to or communicates with the main board 460. The circuit board(s) provided in the mainframe 202 (e.g., main board 460 and control board 470) may be configured as needed for providing signal communication between the second electrical connector 354 and various electronic components (e.g., the electrical power source 462, electronic circuit 464, etc.).

It will be understood that FIGS. 4A and 4B illustrate merely one example of a configuration of mainframe components that may be included in the mainframe 202, and that many other configurations are possible. The particular types of mainframe components included, and their arrangement or layout in the mainframe 202, may vary from one embodiment to another. Moreover, the mainframe components may be of the type generally known to persons skilled in the art, and thus their structures, functions, and operations need not be described in detail herein.

Figure 5A:
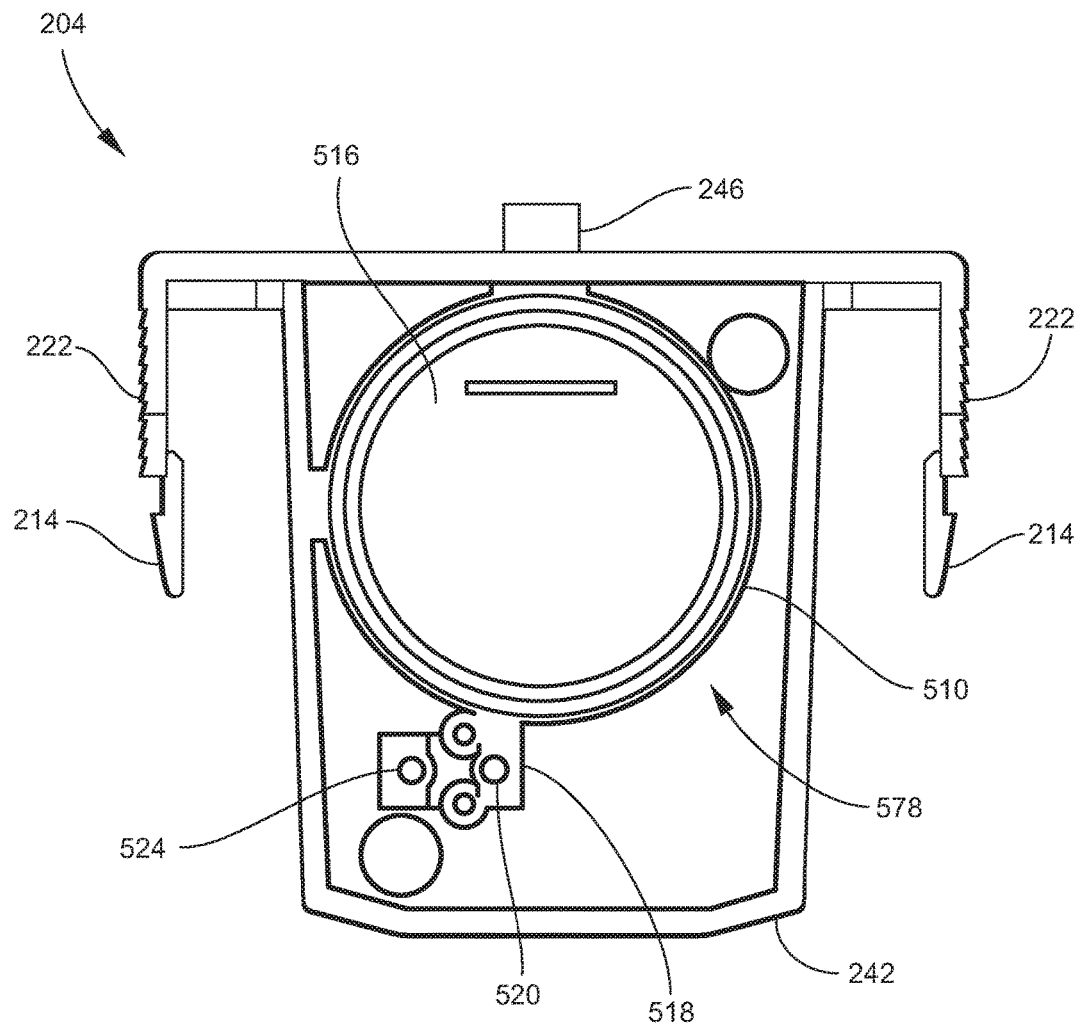
FIG. 5A is a plan view of an example of a cartridge of a fluid flow meter according to some embodiments, with a portion of a housing of the cartridge removed to reveal a cartridge interior.

FIG. 5A is a plan view of an example of the cartridge 204 with a portion of the cartridge housing 242 and various internal components removed to show features of the cartridge interior. The cartridge 204 includes a sensing chamber 578 disposed in the cartridge interior. The chamber 578 may include a chamber wall 510 surrounding the chamber interior. In the illustrated embodiment, the chamber wall 510 is circular and provides a lateral boundary of the chamber 578, whereby the chamber 578 is cylindrical with a cylindrical cross-section. In other embodiments the chamber 578 may have a different geometry. Another chamber wall, or an inside surface 516 of a wall of the cartridge housing 242, may be adjoined to one end of the chamber wall 510 so as to span the cross-section of the chamber 578 at that end, thereby providing an end boundary of the chamber 578 (at the rear or bottom of the chamber 578, from the perspective of FIG. 5A). The cartridge 204 also includes a fluidic interface 518 on which a valve 686 (FIG. 6) may be mounted. The fluidic interface 518 may contain one or more internal passages 520 and 524 communicating with one or more internal passages of the valve 686. One passage 520 may communicate with the chamber interior, and the other passage 524 may communicate with a section of the cartridge interior outside of the chamber 578.

Figure 5B:
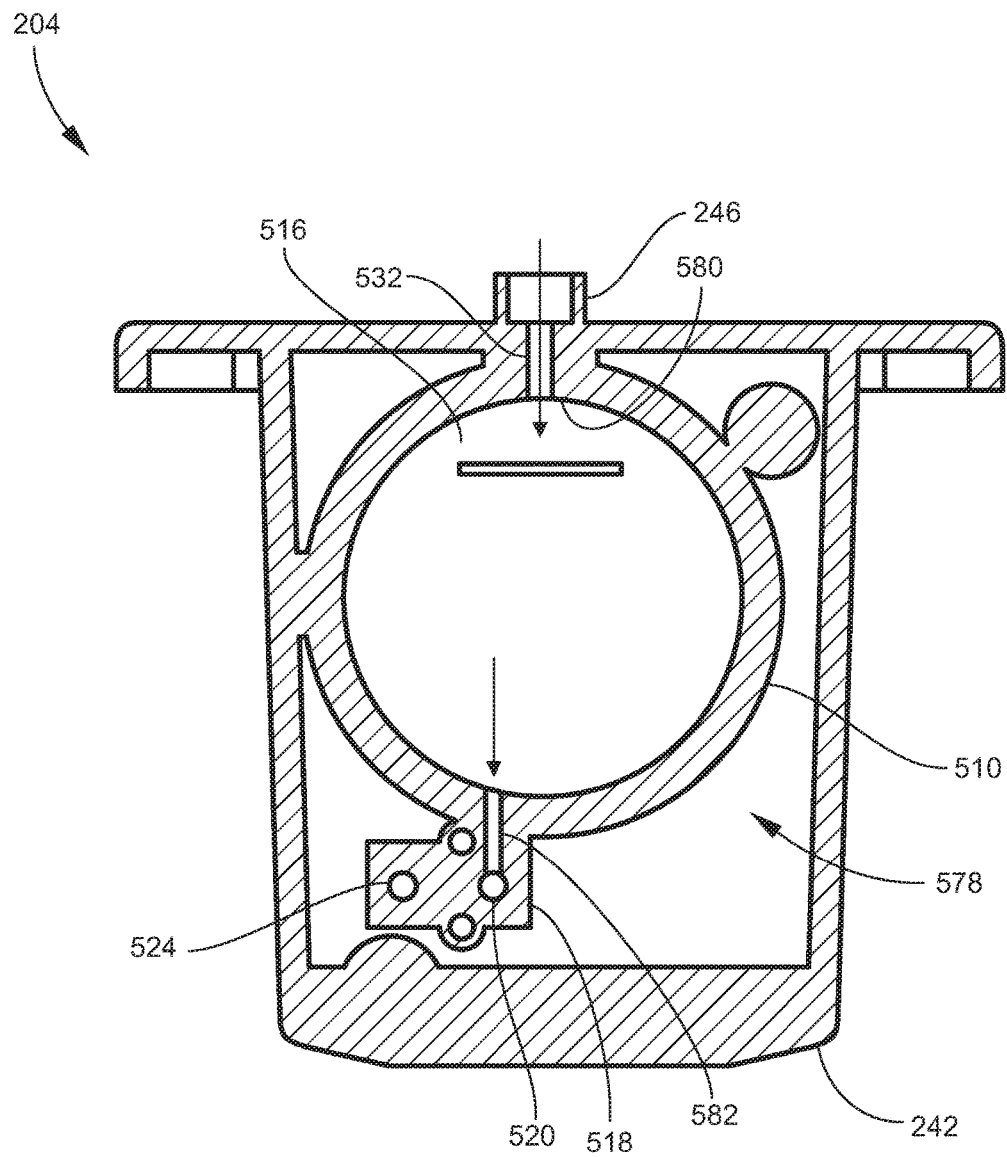
FIG. 5B is a cross-sectional plan view of the cartridge illustrated in FIG. 5A, with the cross-section taken through a chamber wall and a fluidic interface of the cartridge.

FIG. 5B is a cross-sectional plan view of the cartridge 204 illustrated in FIG. 5A, with the cross-section taken through the chamber wall 510 and the fluidic interface 518. A chamber inlet 580 and a chamber outlet 582 communicate with the chamber interior, and are spaced from each other to define a fluid flow path through the chamber interior. The fluid inlet 246 and the chamber inlet 580 are fluidly interconnected by an internal passage 532 formed through the chamber wall 510. In some embodiments and as illustrated, the internal passage 532 may be sized relative to the fluid inlet 246 and the chamber inlet 580 to serve as a flow restrictor. Depending on the embodiment, the internal passage 532 may be considered as being the same component as the chamber inlet 580, or the internal passage 532 (or the chamber inlet 580) may be considered as being an extension of the fluid inlet 246. In some embodiments and as illustrated, the fluid inlet 246, internal passage 532, and chamber inlet 580 may be integral features of the chamber wall 510 and/or a wall of the cartridge housing 242. In other embodiments the fluid inlet 246 (or the fluid inlet 246 and internal passage 532) may be a separate component that is coupled to the cartridge housing 242, and may be removable therefrom. In the illustrated embodiment, the chamber outlet 582 is located across the chamber interior from and generally opposite to the chamber inlet 580. In the illustrated embodiment, the chamber outlet 582 communicates with one of the passages 520 of the fluidic interface 518. The fluid flow path through the chamber 578 provided by this configuration is generally depicted by arrows in FIG. 5B.

Figure 6:
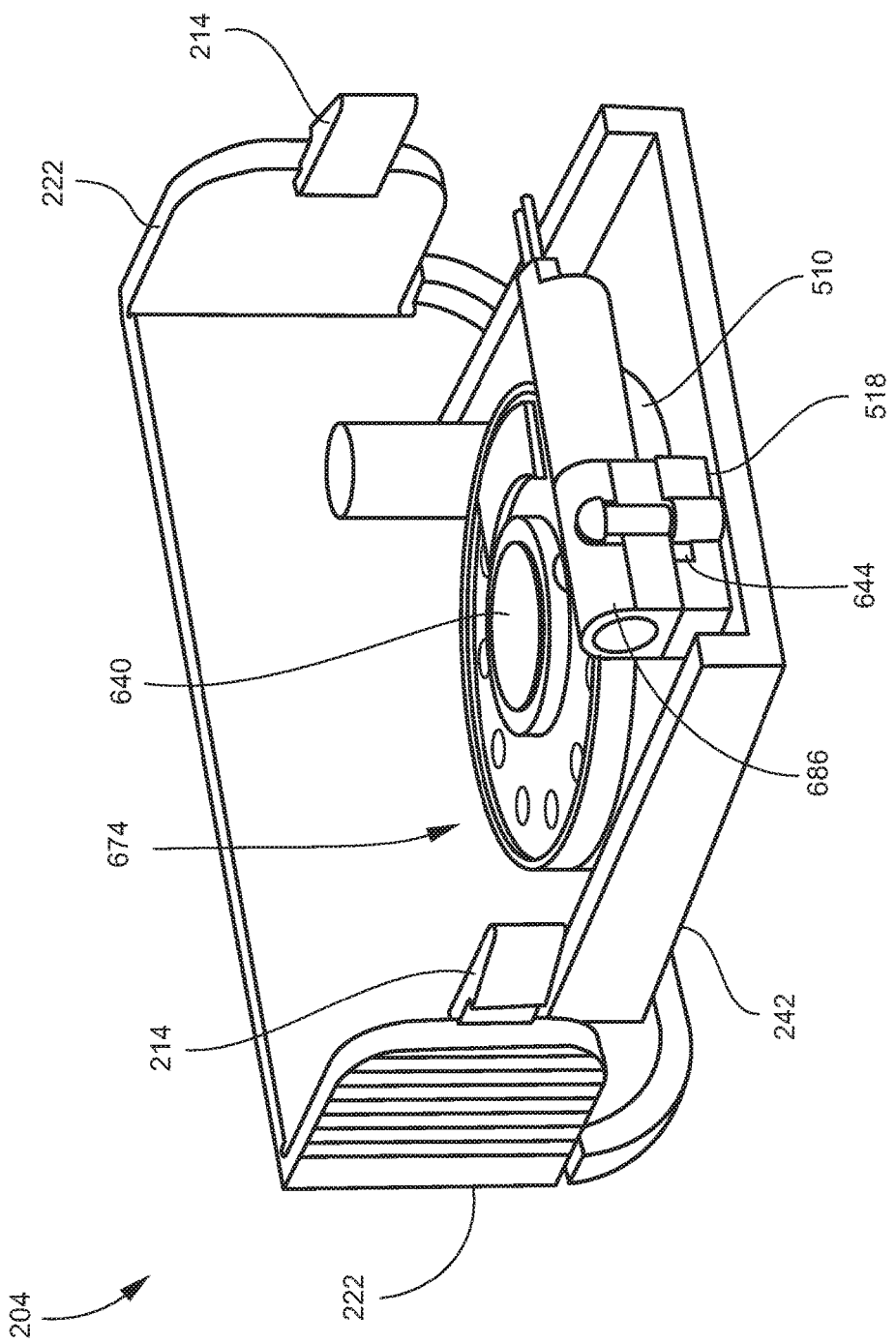
FIG. 6 is a perspective view of the cartridge illustrated in FIG. 5A.
Figure 7:
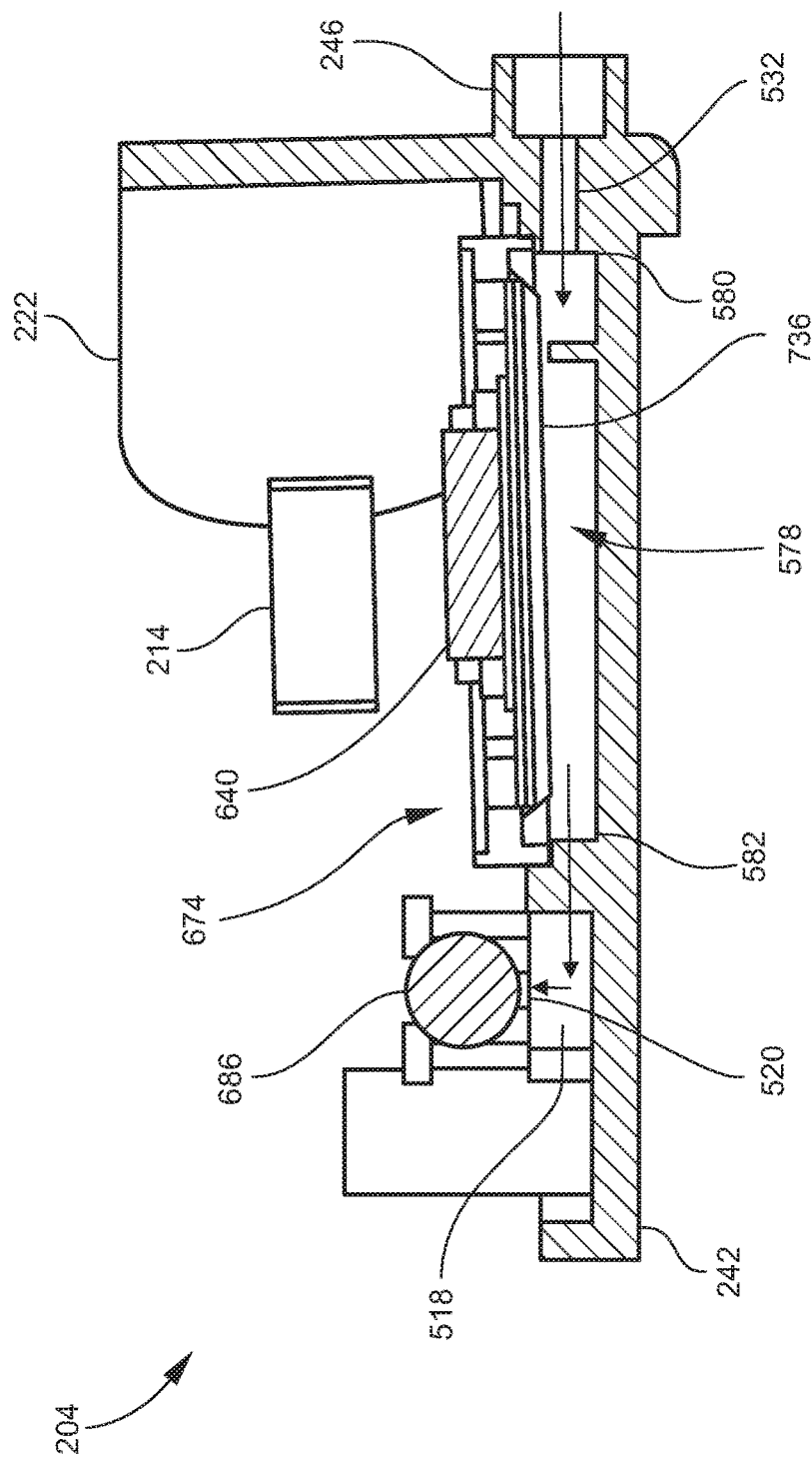
FIG. 7 is a cross-sectional side view of the cartridge illustrated in FIG. 6, with the cross-section taken through a fluid inlet, chamber, and flow sensor of the cartridge.

FIG. 6 is a perspective view of the cartridge 204 illustrated in FIG. 5A. The cartridge 204 includes a flow sensor 674 and a valve 686. FIG. 7 is a cross-sectional side view of the cartridge 204 illustrated in FIG. 6, with the cross-section taken through the fluid inlet 246, the chamber 578, the fluidic interface 518, and the flow sensor 674. In the present embodiment, the flow sensor 674 is configured as an ADT that provides an end boundary of the chamber 578 (at the front or top of the chamber 578, from the perspective of FIG. 6) opposite to the other end boundary of the chamber 578 (i.e., opposite to the inside surface 516 shown in FIGS. 5A and 5B). In such embodiment, the flow sensor 674 may include a diaphragm (or speaker) 736 spanning a substantial portion of the chamber interior, and a central portion 640 attached to the diaphragm 736. The central portion 640 may be configured as a cylindrical core around which a coil or electromagnet (not specifically shown) is wound. A magnet (not specifically shown) may be positioned so as to immerse the coil in a magnetic field. In operation, fluid flow through the chamber 578 (when blocked by the valve 686) causes the diaphragm 736 to expand or deflect outward (upward from the perspective of FIG. 7), which in turn causes the central portion 640 and associated coil to translate in the same direction as the diaphragm 736. The movement of the coil in the magnetic field induces an electrical current in the coil proportional to the rate of movement of the coil. The current outputted from the coil may be transmitted as a measurement signal to the electronic circuit 464 in the mainframe 202 and, along with calibration data, utilized to calculate the flow rate through the chamber 578.

In the present embodiment, the valve 686 is configured to be switched between an open state and a closed state. In the present embodiment, the switching action entails shifting the position of one or more internal passages of the valve 686. For example, the valve 686 may be configured as a spool valve. As shown by arrows in FIGS. 5B and 7, in the open state fluid flows through the fluid inlet 246, the internal passage 532, the chamber inlet 580, the chamber 578, the chamber outlet 582, and the internal passage 520 of the fluidic interface 518, and into the valve 686. Fluid then flows through the valve 686, back into the fluidic interface 518 via the other internal passage 524 thereof, and into the cartridge interior via an outlet port 644 of the fluidic interface 518. The fluid may then exit the cartridge 204 via a suitable fluid outlet (not shown) as described herein, without flowing into the interior of the mainframe 202. Because the fluid flow path through the cartridge interior is completely open while the valve 686 is in the open state, the fluid flow does not displace the movable component of the flow sensor 674 (e.g., diaphragm 736 and central portion 640 in the illustrated embodiment) and thus the flow sensor 674 does not produce a measurement signal (or does not produce a change in an existing measurement signal). On the other hand, in the closed state the internal passage(s) of the valve 686 are shifted so as to block fluid flow through the valve 686 and the fluidic interface 518. Consequently, in the closed state fluid accumulates in the chamber 578, causing displacement of the diaphragm 736 and central portion 640 and producing a measurement signal (or a change in the measurement signal).

Figure 8:
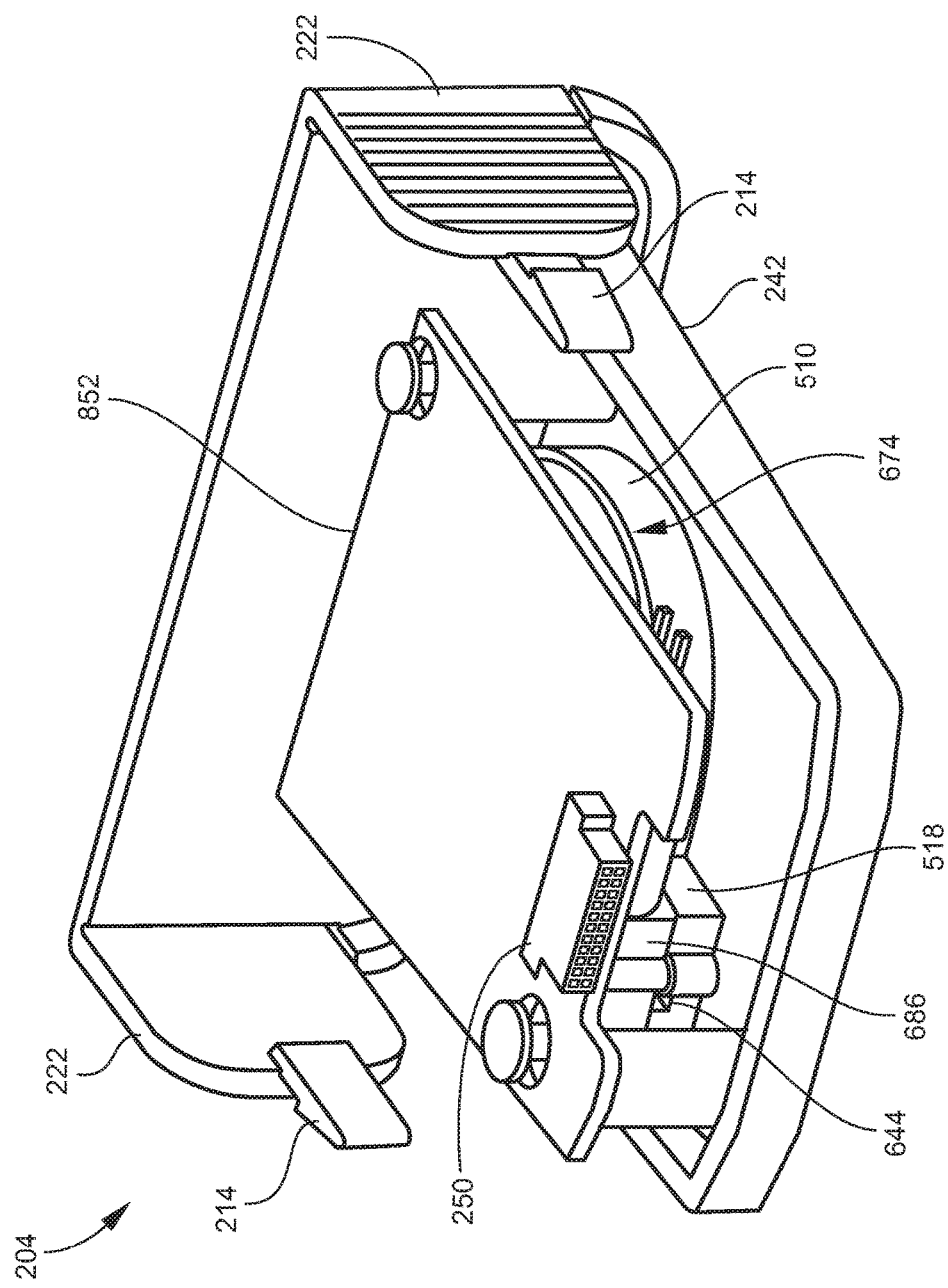
FIG. 8 is another perspective view of the cartridge illustrated in FIG. 5A.

FIG. 8 is another perspective view of the cartridge 204 illustrated in FIG. 5A. In the illustrated embodiment, the cartridge 204 includes a circuit board 852. Various internal cartridge components may be mounted to or at least communicate with the circuit board 852 such as, for example, the first electrical connector 250, power connections to the valve 686, and signal connections to the coil of the flow sensor 674. In addition, a memory as described above (e.g., the memory 188 shown in FIG. 1) may be mounted to the circuit board 852.

Thus, as in certain other embodiments described herein, components of the fluid flow meter 200 affecting the calibration thereof and/or subject to instrument drift, such as the flow sensor 674, the valve 686, and memory containing calibration data, may be located in the replaceable cartridge 204 instead of in the mainframe 202. This configuration enables (re-) calibration of the flow meter 100 by removing the existing cartridge 204 from the mainframe 202 and installing a new cartridge. Additionally, the fluid flow meter 200 may be effective in isolating the fluid being measured from electronic circuitry 264, and/or directing the fluid being measured away from such electronic circuitry 264.

FIGS. 9A to 13 illustrate an example of a fluid flow meter 900 according to another embodiment in which the flow meter 900 has a modular or cartridge-based configuration. Certain features of the flow meter 900 may be the same as or similar to corresponding features of the fluid flow meters 100 and 200 described above in conjunction with FIGS. 1 to 8. Such features are designated by similar reference numerals, and a detailed description of such features will not be repeated.

Figure 9A:
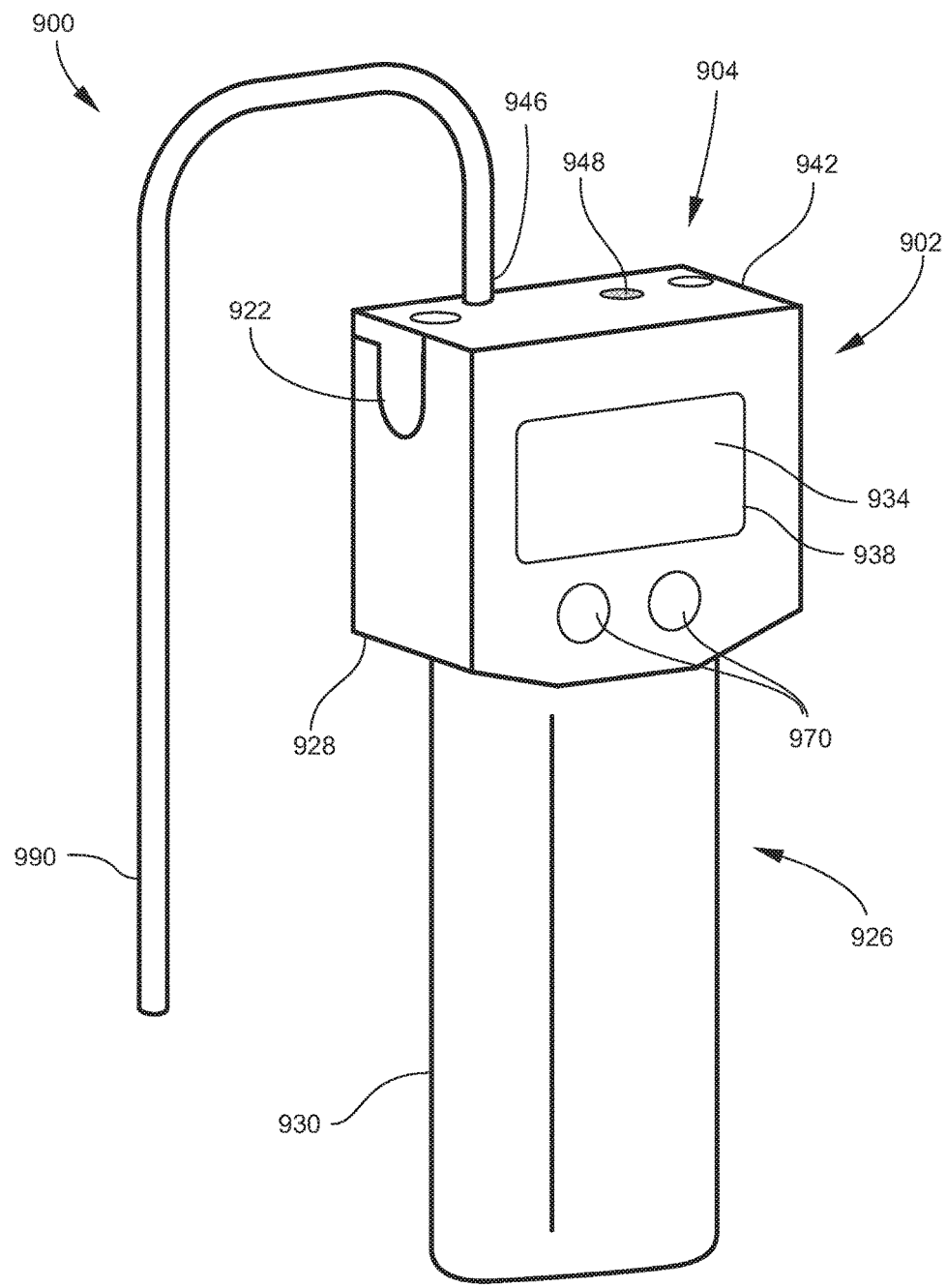
FIG. 9A is a front perspective view of an example of a fluid flow meter according to another embodiment, illustrating a cartridge of the fluid flow meter an installed, operational position in a mainframe of the fluid flow meter.
Figure 9B:
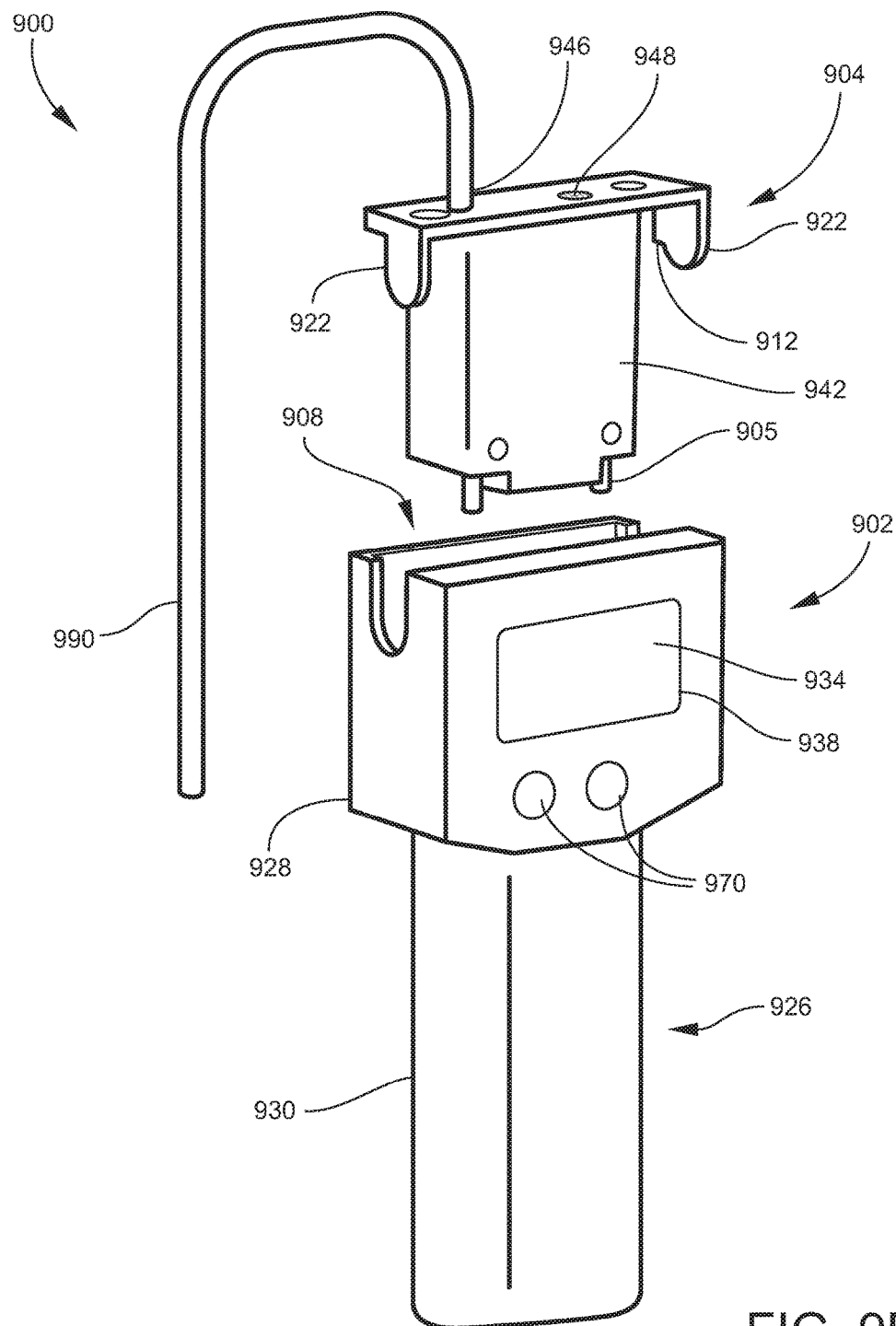
FIG. 9B is another front perspective view of the fluid flow meter illustrated in FIG. 9A, showing the cartridge uninstalled (removed) from the mainframe.

FIG. 9A is a front perspective view of the fluid flow meter 900. The flow meter 900 includes a flow meter mainframe 902 and a flow meter cartridge 904 configured for removable installation in the mainframe 902. FIG. 9A illustrates the cartridge 904 in an installed, operational position in the mainframe 902. FIG. 9B is another front perspective view of the fluid flow meter 900, showing the cartridge 904 uninstalled (removed) from the mainframe 902. In the present embodiment, the mainframe 902 includes a receptacle 908 configured for receiving the cartridge 904. As described elsewhere in the present disclosure, the modular configuration of the flow meter 900 enables the cartridge 904 to be replaced.

The mainframe 902 and the cartridge 904 may be configured such that the cartridge 904 is retained in the mainframe 902 (in the receptacle 908) in a secured or locked, yet removable or releasable, manner. For this purpose, the cartridge 904 may include one or more first engagement members 912 (FIG. 9B) configured for removably engaging or coupling with one or more second engagement members 1015 (FIG. 10) of the mainframe 902. The cartridge 904 is installed in the mainframe 902 by moving or sliding the cartridge 904 into and through the receptacle 908 until the first engagement member 912 engages the second engagement member 1015. To assist in handling the cartridge 904 during installation and uninstallation, the cartridge 904 may include one or more contact sections 922 configured (i.e., sized and positioned) to be contacted by a user's finger or thumb. In some embodiments, the cartridge 904 may also include one or more first guide members 905 configured for removably engaging one or more second guide members 1007. In some embodiments, fasteners such as, for example, screws may be utilized to lock the cartridge 904 in place.

The mainframe 902 may generally include a mainframe (or main) housing 926 that includes a first mainframe section 928 and a second mainframe section 930 as described herein. The mainframe 902 may also include a display screen 934 and user-operated buttons 970 as described herein. The display screen 934 may be framed or surrounded by an opening 938 formed in the first mainframe section 928. The display screen 934 may be flush with or recessed in the opening 938.

The cartridge 904 may generally include a cartridge housing 942. The cartridge 904 may further include a fluid inlet (or cartridge inlet) 946 and a fluid outlet (or cartridge outlet) 948, thereby providing a fluid flow path from the cartridge interior to a point external to the cartridge 904 as described herein. The fluid inlet 946 may be configured for coupling with a tube 990 or other fluidic component as described herein. The tube 990 or other fluidic component may be part of, or placed in fluid communication with, a fluid line in which fluid flow rate is desired to be measured. The cartridge 904 may include a cartridge (or first) electrical connector 1350 (FIG. 13) as described herein.

Figure 10:
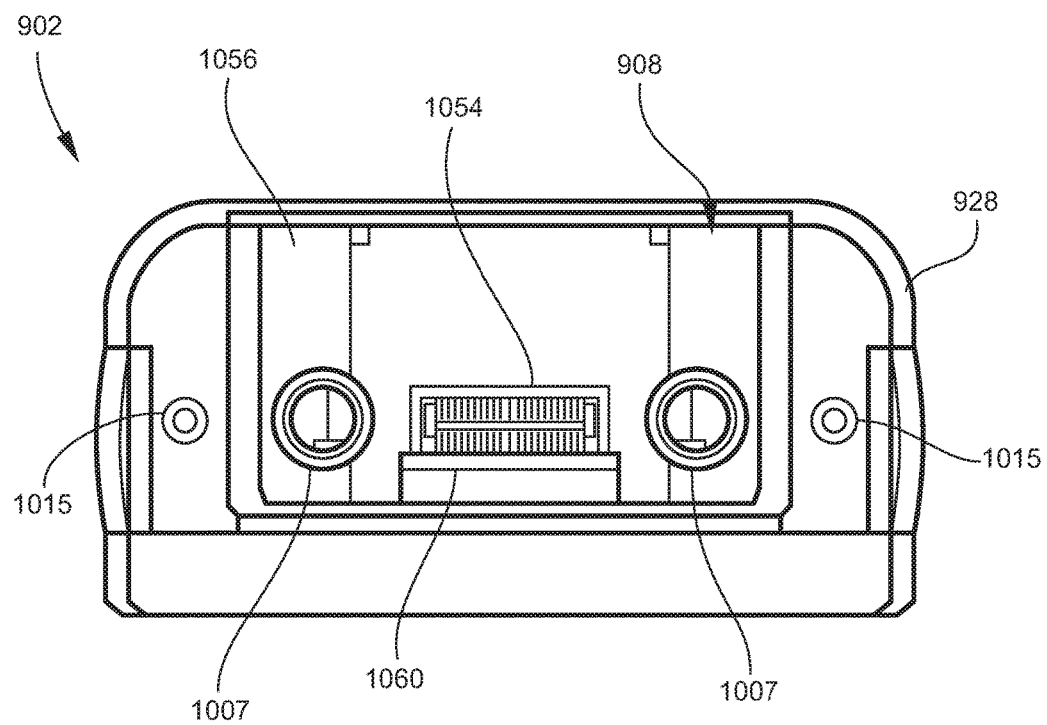
FIG. 10 is a top view of the mainframe illustrated in FIGS. 9A and 9B, without the cartridge installed therein, and looking down into a receptacle of the mainframe.

FIG. 10 is a top view of the mainframe 902 without the cartridge 904 installed therein, i.e., looking down into the receptacle 908. The mainframe 902 may include a mainframe (or second) electrical connector 1054 configured for removable coupling with the first electrical connector 1350 (FIG. 13) of the cartridge 904, as described herein. The second electrical connector 1054 may mounted on a main board 1060 of the mainframe 902.

As also shown in FIG. 10, the mainframe 902 may include an interior wall 1056 disposed between the receptacle 908 and the mainframe interior. The interior wall 1056 may serve as the base or floor of the receptacle 908. The interior wall 1056 may partition or provide a boundary between the receptacle 908 and the interior of the mainframe 902. As described above, this boundary may or may not be fluid-tight as desired to prevent or substantially prevent (or limit) excursion of fluid into the mainframe interior from the cartridge interior.

FIG. 10 also shows the second engagement members 1015 and the second guide members 1007 of the mainframe 902. In some embodiments, the first guide members 905 (FIG. 9B) may be shaped as posts that are inserted through the second guide members 1007 as the cartridge 904 is moved into the installed position. In some embodiments, the second guide members 1007 may be or include resilient rings that form a seal around the first guide members 905 to prevent fluid in the cartridge 904 from entering the mainframe interior.

Figure 11:
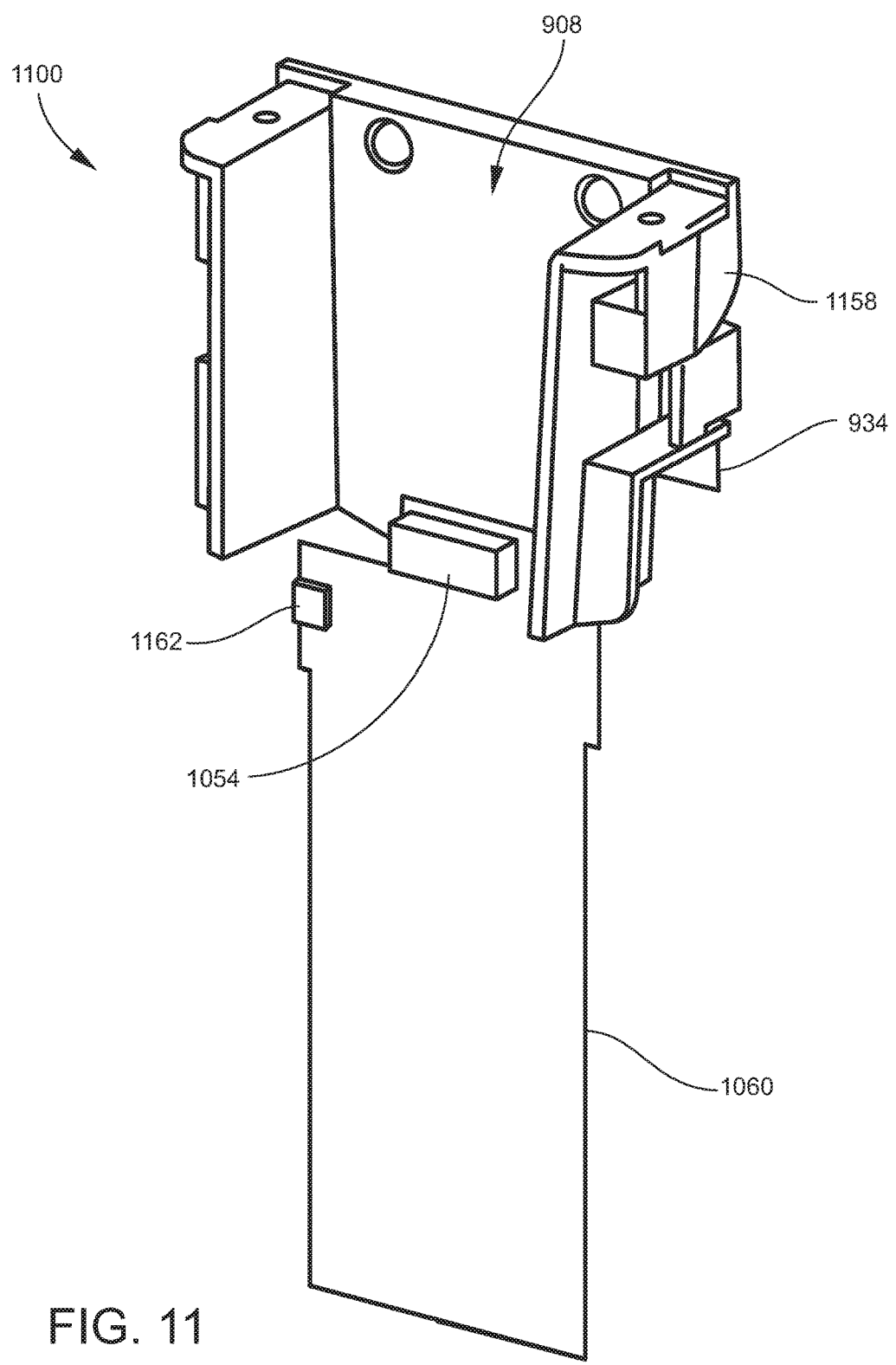
FIG. 11 is a rear perspective view of an example of an internal assembly of mainframe components that may be included in a fluid flow meter according to some embodiments.

FIG. 11 is a rear perspective view of an example of an internal assembly 1100 of mainframe components that may be included in the mainframe 902 according to some embodiments. In the illustrated embodiment, the mainframe components may include the display screen 934 mounted to a support structure 1158 (which may at least partially define the receptacle 908), the second electrical connector 1054 mounted to or communicating with a main circuit board 1060 (or main board, or first circuit board), an electrical power source 1162 (e.g., a power connection such as a USB connector) mounted to or communicating with the main board 1060, and an electronic circuit (not shown) mounted to or communicating with the main board 1060 such as via a control board (not shown), as described herein.

Figure 12A:
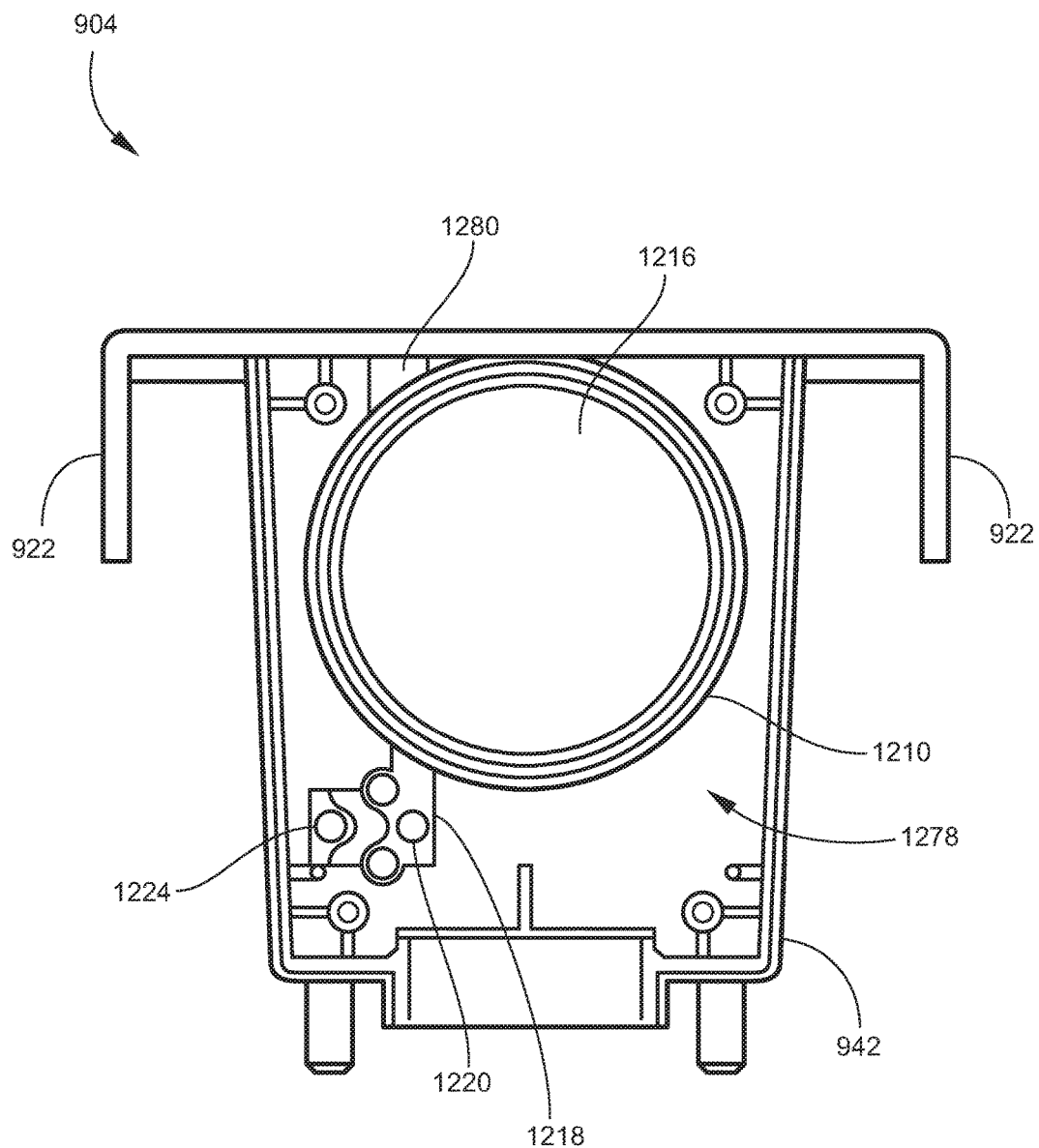
FIG. 12A is a plan view of an example of a cartridge of a fluid flow meter according to some embodiments, with a portion of a housing of the cartridge removed to reveal a cartridge interior.

FIG. 12A is a plan view of the cartridge 904 with a portion of the cartridge housing 942 and various internal components removed to show features of the cartridge interior. The cartridge 904 includes a sensing chamber 1278 disposed in the cartridge interior. The chamber 1278 may include a chamber wall 1210 surrounding the chamber interior. In the illustrated embodiment, the chamber wall 1210 is circular and provides a lateral boundary of the chamber 1278, whereby the chamber 1278 is cylindrical with a cylindrical cross-section. In other embodiments the chamber 1278 may have a different geometry. An inside surface 1216 of a wall of the cartridge housing 942 may provide an end boundary of the chamber 1278. The cartridge 904 also includes a fluidic interface 1218 on which a valve (e.g., the valve 686 shown in FIG. 6) may be mounted. The fluidic interface 1218 may contain one or more internal passages 1220 and 1224 as described herein.

Figure 12B:
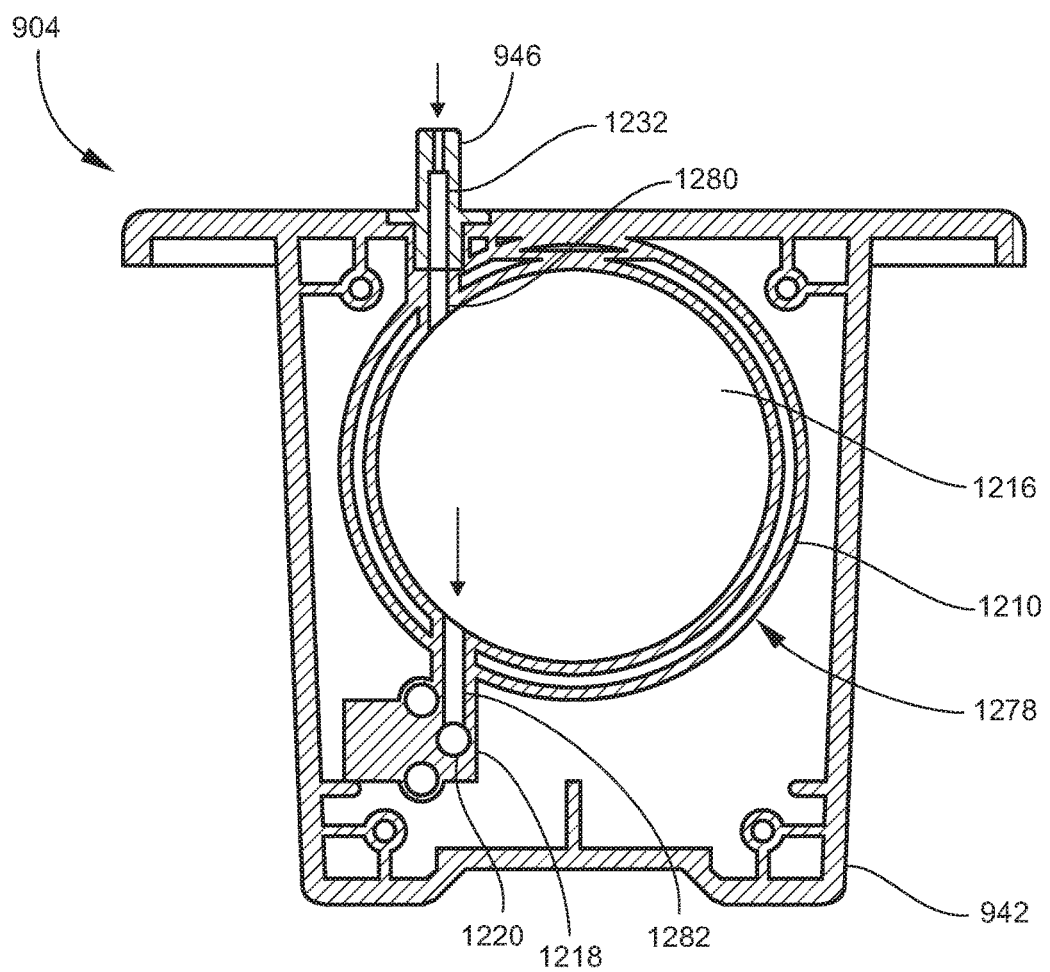
FIG. 12B is a cross-sectional plan view of the cartridge illustrated in FIG. 12A, with the cross-section taken through a chamber wall and a fluidic interface of the cartridge.

FIG. 12B is a cross-sectional plan view of the cartridge 904 illustrated in FIG. 12A, with the cross-section taken through the chamber wall 1210 and the fluidic interface 1218. A chamber inlet 1280 and a chamber outlet 1282 communicate with the chamber interior, and are spaced from each other to define a fluid flow path through the chamber interior. In the illustrated embodiment, a fluidic component providing the fluid inlet 946 and an internal passage 1232 is coupled to the cartridge housing 942 whereby the internal passage 1232 fluidly interconnects the fluid inlet 946 and the chamber inlet 1280. In the illustrated embodiment, the chamber outlet 1282 is located across the chamber interior from and generally opposite to the chamber inlet 1280. As compared to the embodiment shown in FIG. 5B, the fluid inlet 946, internal passage 1232, and chamber inlet 1280 are positioned off-center relative to a center line (e.g., diameter) of the chamber interior. The fluid flow path through the chamber 1278 provided by this configuration is generally depicted by arrows in FIG. 12B.

The cartridge 904 may further include a flow sensor, such as a displacement-type flow sensor (e.g., an ADT). The displacement-type flow sensor may include a movable boundary such as a diaphragm, and other components as described herein. In some embodiments, the flow sensor and the valve may operate as described above in conjunction with FIGS. 6 and 7.

The flow meter 900 may generally operate in the same way as the flow meter 100 as described above in conjunction with FIG. 1 and/or the flow meter 200 as described above in conjunction with FIGS. 2A to 8. The flow meter 900 with its cartridge-based configuration may provide the same advantages as the flow meter 100 and/or the flow meter 200.

Figure 13:
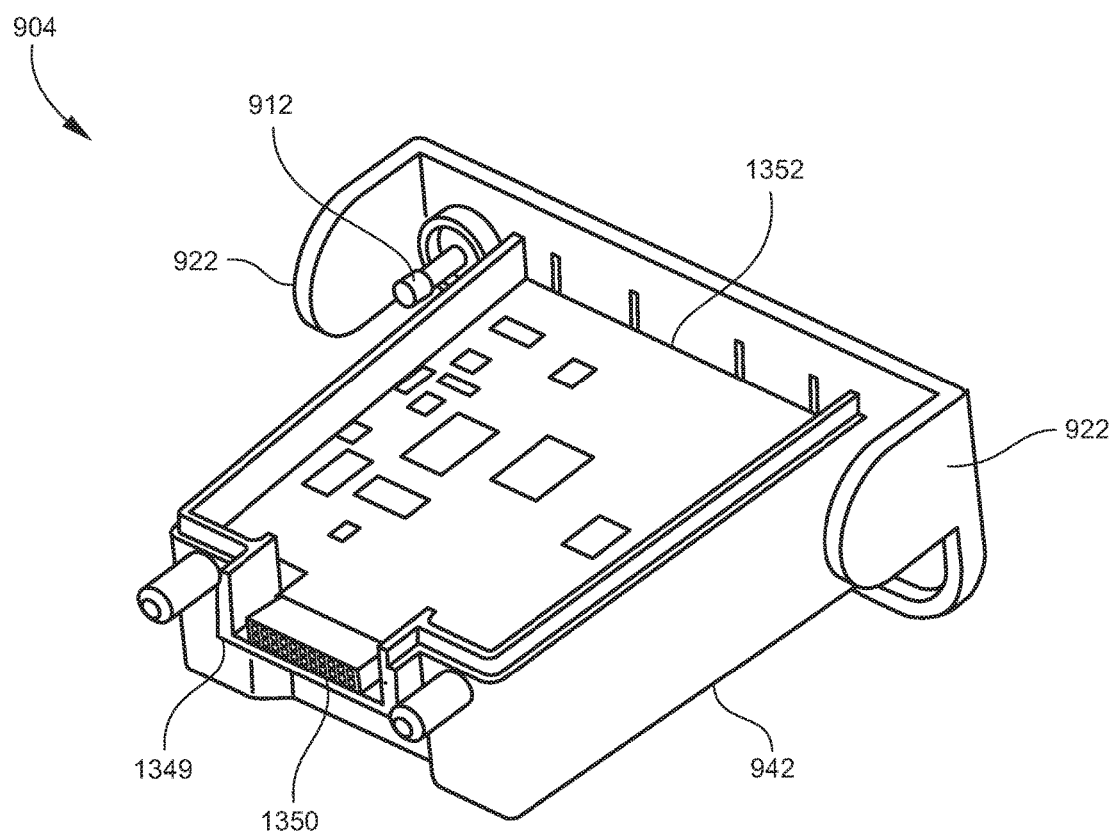
FIG. 13 is a perspective view of the cartridge illustrated in FIG. 12A.

FIG. 13 is a perspective view of the cartridge 904 illustrated in FIG. 12A. In the illustrated embodiment, the cartridge 904 includes a circuit board 1352. A first electrical connector 1350 is accessible via an opening 1349 of the cartridge 904. Various internal cartridge components may be mounted to or at least communicate with the circuit board 1352 such as, for example, the first electrical connector 1350, power connections to the valve, and signal connections to the coil of the flow sensor. In addition, a memory as described above (e.g., the memory 188 shown in FIG. 1) may be mounted to the circuit board 1352.

One example of a method for operating a cartridge-based flow meter as described herein (e.g., the flow meter 100, flow meter 200, or flow meter 900) will now be described with the understanding that the example does not limit the broadest aspects of the subject matter disclosed herein. The method includes installing a cartridge in a mainframe of the flow meter such that a first electrical connector of the cartridge is coupled to a second electrical connector of the mainframe. The cartridge and the mainframe may be configured according to any of the embodiments disclosed herein. In some embodiments, the method includes installing the cartridge by moving the cartridge into a receptacle of the mainframe as described herein. In some embodiments, the method includes engaging the cartridge with the mainframe in a manner that assists in retaining the cartridge in the proper installed position in the mainframe, such as in a locked or secured manner, as described herein. In some embodiments, the method includes uninstalling the cartridge from the mainframe and installing a new cartridge in the mainframe as described herein.

Another example of a method for operating a cartridge-based flow meter includes installing a cartridge in a mainframe of the flow meter by moving the cartridge into a receptacle of the mainframe and coupling a first electrical connector of the cartridge with a second electrical connector of the mainframe. A flow of fluid is established through a fluid inlet, a chamber, and a fluid outlet of the cartridge as described herein. While the fluid flows, a flow sensor is operated to measure a flow rate of the fluid through the chamber. The flow sensor outputs a measurement signal, which is transmitted to an electronic circuit disposed in the mainframe via the first electrical connector and the second electrical connector. The fluid flow rate may then be calculated using the measurement signal. In some embodiments, calibration data may also be utilized to calculate the fluid flow rate. The calibration data may be retrieved from a memory disposed in the flow meter. In some embodiments, the memory is disposed in the cartridge, as described herein.

In embodiments utilizing a displacement-type flow sensor, flow measurement is performed while the fluid flow is confined to the chamber such that the fluid accumulates in the chamber, thereby causing displacement of a movable boundary. The physical event of movement of the movable boundary is sensed, and thereafter correlated with fluid flow rate. Confinement of the fluid flow may be achieved by closing a valve that is in the flow path on the output side of the chamber, as described herein.

Figure 14:
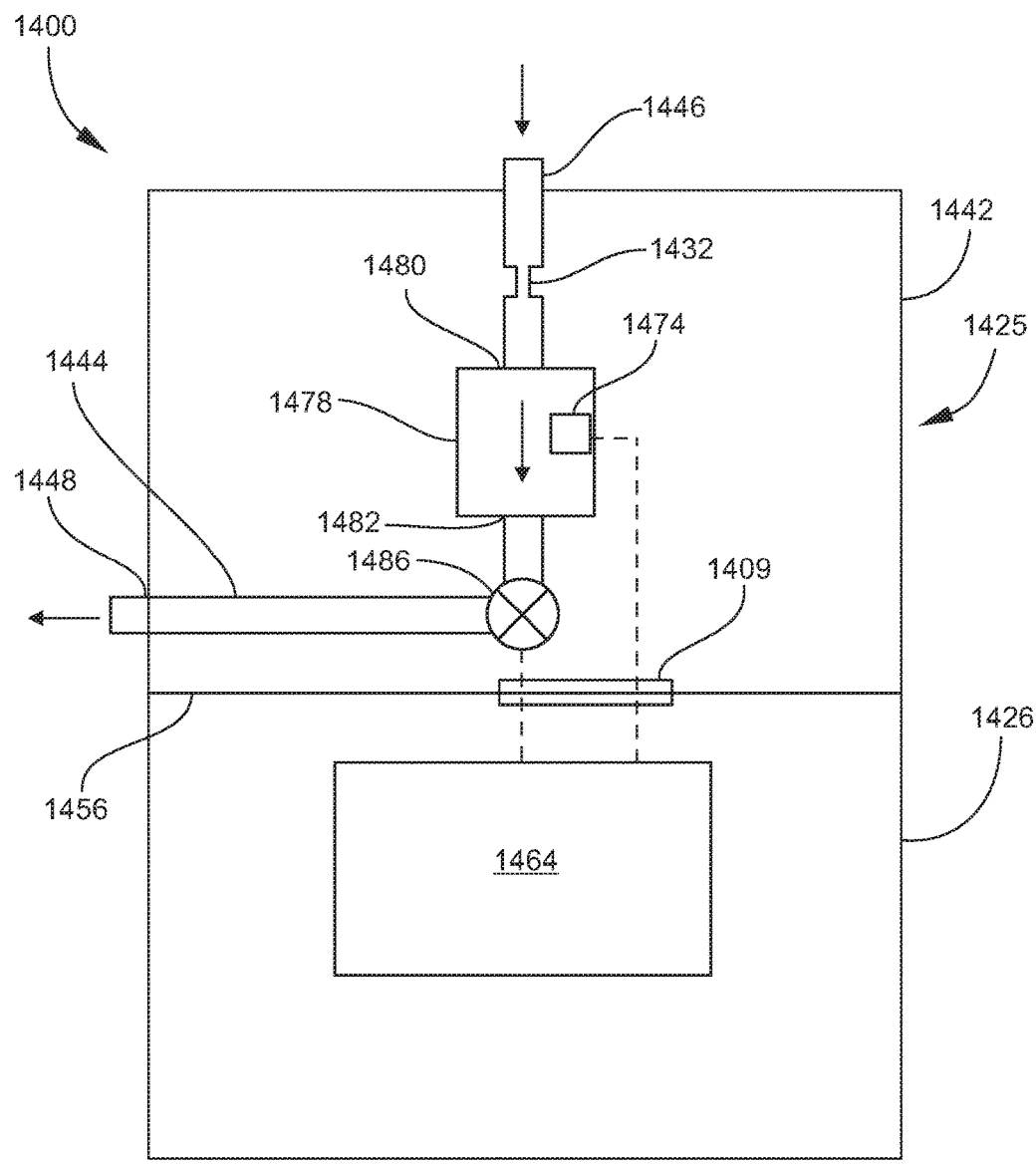
FIG. 14 is a schematic view of an example of a fluid flow meter according to another embodiment.
Figure 15:
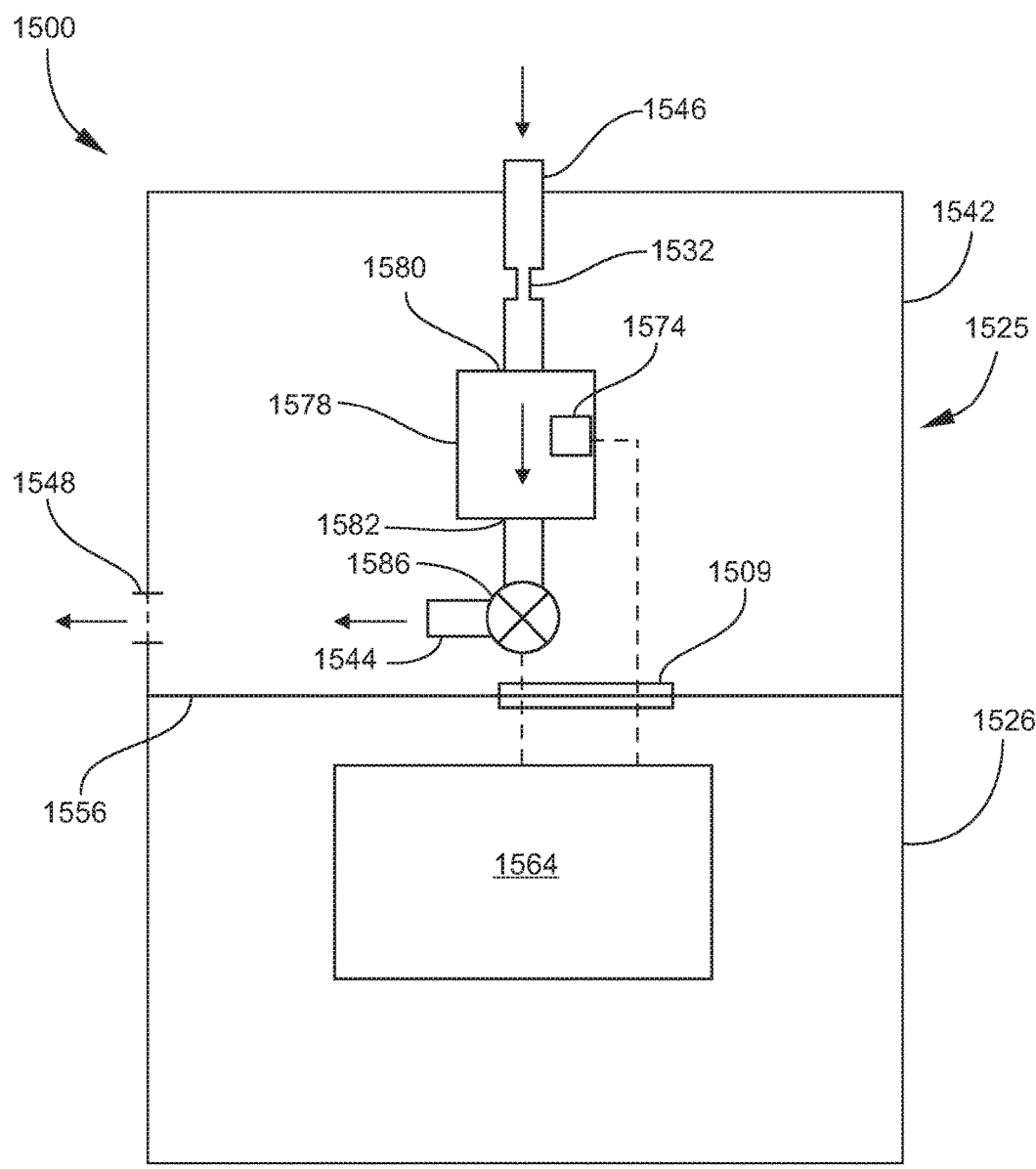
FIG. 15 is a schematic view of an example of a fluid flow meter according to another embodiment.

FIGS. 14 and 15 illustrate examples of fluid flow meters 1400 and 1500 according to other embodiments that may operate without the use of a cartridge. Certain features of the fluid flow meters 1400 and 1500 may be the same as or similar to corresponding features of the fluid flow meters 100, 200, and 900 described above in conjunction with FIGS. 1 to 13. Such features are designated by similar reference numerals, and a detailed description of such features will not be repeated.

FIG. 14 is a schematic view of an example of a fluid flow meter 1400 according to another embodiment. Generally, the flow meter 1400 includes a flow meter housing 1425. The flow meter housing 1425 may include one or more housing walls that enclose the components of the flow meter 1400, i.e., the components of the flow meter 1400 are disposed in the interior of the flow meter housing 1425. The flow meter housing 1425 may include a main housing (or region) 1426 and a flow sensing housing (or region) 1442. The flow meter 1400 may include electronic circuitry 1464 comprising various components configured for implementing functions of the flow meter 1400 as described herein. Some or all of the electronic circuitry 1464 may be positioned in the main housing 1426. The flow meter 1400 may also include fluidic components configured for defining a fluid flow path through the flow meter housing 1425, and flow measurement components configured for measuring the flow rate of a fluid flowing into the fluid flow path from an external source. The flow meter 1400 may be configured so as to fluidly isolate some or all of the electronic circuitry 1464 from the fluid flowing in the fluid flow path. In the illustrated embodiment, the fluid flow path is confined to the sensing housing 1442 whereby the interior of the main housing 1426, and thus the electronic circuitry 1464 disposed in the main housing 1426, is isolated from the fluid in the fluid flow path. Thus, the sensing housing 1442 may be considered as the part of the flow meter housing 1425 containing the fluidic components and the flow measurement components. The main housing 1426 may be considered as the remaining part of the flow meter housing 1425, which may contain all or part of the electronic circuitry 1464 provided with the flow meter 1400.

The flow meter housing 1425 (particularly the sensing housing 1442 in the present embodiment) may include a fluid inlet 1446 formed or extending through an outer housing wall, and configured to provide a fluid flow path from a point external to the flow meter 1400 into the interior of the flow meter housing 1425. The fluid inlet 1446 may be configured as a port (or fluid fitting) configured for coupling with fluidics external to the flow meter 1400 as described herein. The flow meter housing 1425 (particularly the sensing housing 1442 in the present embodiment) may further include a fluid outlet 1448 formed or extending through an outer housing wall, and configured to provide a fluid flow path from the housing interior (or from a fluidic component disposed therein) to a point external to the flow meter 1400. As illustrated, the fluid outlet 1448 may be located such that fluid is discharged from the flow meter 1400 at a side of the flow meter 1400 different from the side at which the fluid inlet 1446 is located. Alternatively, the fluid outlet 1448 may be located on the same side as the fluid inlet 1446. In some embodiments and as illustrated, the fluid outlet 1448 may be the end of a fluid outlet conduit 1444 that is (substantially) flush with an outside surface of the flow meter housing 1425 or, as illustrated, extends for a distance beyond the flow meter housing 1425 and into the ambient. Optionally, the end of the outlet conduit 1444 may be configured for coupling with external fluidics. In other embodiments, the fluid outlet 1448 may be a vent communicating with the housing interior (particularly the sensing housing interior in the present embodiment) and with the ambient.

Generally, the flow meter 1400 defines (or establishes or forms) a fluid flow path from the fluid inlet 1446, through the housing interior (including through one or more components disposed in the housing interior, as described below), and to the fluid outlet 1448. In some embodiments, the fluid outlet 1448 may be a port directly connected to, or may be part of, an internal fluidic component disposed in the housing interior such as the illustrated outlet conduit 1444. The outlet conduit 1444 may enclose a space isolated from the rest of the space in the housing interior. Alternatively, the fluid outlet 1448 may be a vent communicating with the outlet conduit 1444, in which case the outlet conduit 1444 may be configured (e.g., structured, sized, etc.) as an outlet chamber forming a part of the fluid flow path that is isolated from the rest of the space in the housing interior. In such embodiments, the fluid flow path through the housing interior may be defined entirely by internal components that are located in the housing interior, wherein the space in the housing interior outside of such internal components is not part of the fluid flow path. In other embodiments, the fluid outlet 1448 may be a vent in open communication with a space in the housing interior, i.e., with a portion of the housing interior not enclosed by an internal component disposed in the housing interior. In this case, the housing interior (or at least some portion or space thereof) is part of the fluid flow path.

The flow meter 1400 includes a fluid flow sensor 1474 (or flow rate sensor) configured to sense the flow rate of a fluid flowing along the flow path. In the present embodiment, the flow meter 1400 also includes a sensing chamber 1478 that is part of the fluid flow path in the housing interior. Thus the chamber 1478 is located between, and communicates with, the fluid inlet 1446 and the fluid outlet 1448. Generally, the chamber 1478 may be any part of the flow path in the housing interior that serves as a sensing volume or zone with which the flow sensor 1474 can interact to sense the flow rate of fluid flowing into the housing interior via the fluid inlet 1446. The chamber 1478 is configured (structured) to at least partially define a chamber interior that is distinct and isolated from the rest of the housing interior. For example, the chamber 1478 may include one or more chamber walls that define the chamber interior, or at least partially define the chamber interior in combination with other structures in the flow meter housing 1425.

In the present embodiment, the flow meter 1400 (or the chamber 1478) includes a chamber inlet 1480 and a chamber outlet 1482, both internal to the housing 1425 and upstream of the fluid outlet 1448. The chamber 1478 (or chamber interior) is thus located between, and communicates with, the chamber inlet 1480 and the chamber outlet 1482. The chamber inlet 1480 communicates with the fluid inlet 1446. The chamber inlet 1480 and the fluid inlet 1446 may be part of the same structure. For example, the chamber inlet 1480 and the fluid inlet 1446 may both be defined by the housing 1425, or may both be part of the same inlet conduit. In some embodiments, the chamber inlet 1480 and the fluid inlet 1446 may be considered to be a single fluidic structure or component. Alternatively, the chamber inlet 1480 and the fluid inlet 1446 may be different structures. For example, the fluid inlet 1446 may be a fitting or the like that is coupled to the housing 1425 so as to place the fluid inlet 1446 in fluid communication with the chamber inlet 1480, which may be either a conduit or a channel formed by the housing 1425. In some embodiments, a conduit or passage 1432 interconnects the fluid inlet 1446 with the chamber inlet 1480. In some embodiments and as illustrated, the interconnecting conduit or passage 1432 may be or include a flow restrictor. The conduit or passage 1432 may be integral with the fluid inlet 1446, the chamber inlet 1480, or both. In all such embodiments, the fluid flow path runs from the fluid inlet 1446 and through the chamber inlet 1480, the chamber 1478, the chamber outlet 1482, and the fluid inlet 1446, and to the fluid outlet 1448. The fluid flow path through the flow meter 1400 is generally depicted by solid-line arrows in FIG. 14, with the valve 1486 being part of the fluid flow path.

Generally, the flow sensor 1474 may be any device operable as a transducer to convert a fluid flow rate sensed in the chamber 1478 into an electrical output signal (flow measurement signal) that can be processed to generate a user-interpretable readout indicative of fluid flow rate, and the chamber 1478 may have any geometry suitable for the operation of the flow sensor 1474, as described herein.

Particularly when the flow sensor 1474 is configured as a displacement flow sensor, the flow meter 1400 may include a valve 1486 positioned in the flow path downstream from the chamber 1478, i.e., between the chamber outlet 1482 and the fluid outlet 1448, which is switchable between an open state and a closed state as described herein. In some embodiments and as illustrated, the outlet of the valve 1486 directly communicates with the outlet conduit 1444 (as a tube, channel, or chamber), whereby the entire fluid flow path through the housing 1425 is closed and isolated from the rest of the housing interior. In other embodiments in which the outlet conduit 1444 is not provided, the outlet of the valve 1486 may be in open communication with the housing interior, in which case the fluid flow path traverses the housing interior from the outlet of the valve 1486 to the fluid outlet 1448, which may be configured as a vent in such case.

As evident from the foregoing, the flow meter 1400 is configured such that the fluid flow path is confined to the portion of the flow meter housing 1425 referred to as the sensing housing 1442, thereby eliminating or at least substantially reducing any fluid flow into the other portion of the flow meter housing 1425 referred to as the main housing 1426. Thus, any electronic circuitry 1464 or other components of the flow meter 1400 disposed in the main housing 1426 may be isolated from the fluid flow during operation of the flow meter 1400.

In some embodiments, the flow meter 1400 may additionally include an interior wall 1456 that partitions, or provides a boundary between, the sensing housing 1442 and the main housing 1426. Depending on the embodiment, the boundary provided by the interior wall 1456 (i.e., the interface between the interior wall 1456 and other structures of the flow meter housing 1425) may or may not be fluid-tight. In embodiments where the interior of the sensing housing 1442 serves as part of the fluid flow path (not shown), it may be desirable that the boundary provided by the interior wall 1456 be (substantially) fluid-tight.

As in other embodiments described herein, the electronic circuitry 1464 may include one or more electronic components (hardware, firmware, etc.) as needed for carrying out various electronic functions of the flow meter 1400, such as storing and retrieving data, calculating flow rate and calibrating measurements, routing and regulating electrical power, formatting and transmitting data for display or printout, etc. Hence, the electronic circuitry 1464 may include, for example, one or more electronic processors or controllers, one or more memories, one or more circuit boards, etc. For example, the electronic circuit 1464 may control the operation of the flow sensor 1474 and the valve 1486, and may receive measurement signals from the flow sensor 1474, via electrical interconnections schematically depicted by dashed lines in FIG. 14. Moreover the flow sensor 1474 and the valve 1486, if they are active (power consuming) devices, may receive power signals from a suitable electrical power source (e.g., batteries and/or USB port, not shown) provided by the flow meter 1400 as described herein. The flow meter 1400 may also include one or more display screens (not shown), indicator lights (e.g., light-emitting diodes, not shown), and one or more user-operated buttons (not shown), as described herein. When the interior wall 1456 is provided, a feedthrough 1409 may be mounted to or formed by the interior wall 1456 to accommodate routing of electrical lines between components located in the sensing housing 1442 (e.g., flow sensor 1474, valve 1486, etc.) and components located in the main housing 1426 (e.g., electronic circuitry 1464, power source, etc.).

FIG. 15 is a schematic view of an example of a fluid flow meter 1500 according to another embodiment. Generally, the flow meter 1500 includes a flow meter housing 1525. The flow meter housing 1525 may include a main housing (or region) 1526 and a flow sensing housing (or region) 1542 as described herein. The flow meter 1500 may include electronic circuitry 1564, some or all of which may be positioned in the main housing 1526. The flow meter 1500 may also include fluidic components configured for defining a fluid flow path through the flow meter housing 1525, and flow measurement components configured for measuring the flow rate of a fluid flowing into the fluid flow path from an external source. The flow meter 1500 may be configured to confine the fluid flow path to the sensing housing 1542 and thereby fluidly isolate the main housing 1526 (and thus components disposed in the main housing 1526, such as electronic circuitry 1564) from the fluid flowing in the fluid flow path.

The flow meter housing 1525 (particularly the sensing housing 1542 in the present embodiment) may include a fluid inlet 1546 configured to provide a fluid flow path from a point external to the flow meter 1500 into the interior of the flow meter housing 1525, and a fluid outlet 1548 configured to provide a fluid flow path from the housing interior to a point external to the flow meter 1500, as described herein. The fluid inlet 1546 and the fluid outlet 1548 may be located on the same side of the flow meter 1500 or, as illustrated, on different sides of the flow meter 1500.

Generally, the flow meter 1500 defines (or establishes or forms) a fluid flow path from the fluid inlet 1546, through the housing interior (including through one or more components disposed in the housing interior, as described below), and to the fluid outlet 1548. In the present embodiment, the fluid outlet 1548 may be a vent in open communication with a space in the housing interior, i.e., with a portion of the housing interior not enclosed by an internal component disposed in the housing interior. In this case the housing interior, or at least some portion or space thereof between the outlet port (or a fluid outlet conduit 1544 communicating with or serving as an extension of the outlet port) of the valve 1586 is part of the fluid flow path.

As described herein, the flow meter 1500 includes a sensing chamber 1578 that is part of the fluid flow path in the housing interior, and a fluid flow sensor 1574 (or flow rate sensor) configured to sense the flow rate of a fluid flowing along the flow path into the sensing chamber 1578. Thus the chamber 1578 is located between, and communicates with, the fluid inlet 1546 and the fluid outlet 1548.

In the present embodiment, the flow meter 1500 (or the chamber 1578) includes a chamber inlet 1580 and a chamber outlet 1582, both internal to the housing 1525 and upstream of the fluid outlet 1548. The chamber 1578 (or chamber interior) is thus located between, and communicates with, the chamber inlet 1580 and the chamber outlet 1582. The chamber inlet 1580 communicates with the fluid inlet 1546, which may be via a conduit or passage 1532 that may serve as a flow restrictor as described herein. The fluid flow path thus runs from the fluid inlet 1546 and through the chamber inlet 1580, the chamber 1578, the chamber outlet 1582, and the fluid inlet 1546, and to the fluid outlet 1548. The fluid flow path through the flow meter 1500 is generally depicted by solid-line arrows in FIG. 15.

As described herein, the flow sensor 1574 may be configured as a displacement flow sensor, in which case a valve 1586 may be positioned in the flow path downstream from the chamber 1578, i.e., between the chamber outlet 1582 and the fluid outlet 1548, which is switchable between an open state and a closed state. In the present embodiment, the outlet of the valve 1586 is in open communication with the housing interior, in which case the fluid flow path traverses the housing interior from the outlet of the valve 1586 to the fluid outlet 1548, which may be configured as a vent in such case. Also in the present embodiment, the flow meter 1500 includes an interior wall 1556 that partitions, or provides a boundary between, the sensing housing 1542 and the main housing 1526. The boundary provided by the interior wall 1556 (i.e., the interface between the interior wall 1556 and other structures of the flow meter housing 1525) may be (substantially) fluid-tight.

As evident from the foregoing, the flow meter 1500 is configured such that the fluid flow path is confined to the portion of the flow meter housing 1525 referred to as the sensing housing 1542, thereby eliminating or at least substantially reducing any fluid flow into the other portion of the flow meter housing 1525 referred to as the main housing 1526. Thus, any electronic circuitry 1564 or other components of the flow meter 1500 disposed in the main housing 1526 may be isolated from the fluid flow during operation of the flow meter 1500.

As in other embodiments described herein, the electronic circuitry 1564 may include one or more electronic components (hardware, firmware, etc.) as needed for carrying out various electronic functions of the flow meter 1500. Hence, the electronic circuitry 1564 communicate with components such as the flow sensor 1574 and the valve 1586 via electrical interconnections schematically depicted by dashed lines in FIG. 15. The flow meter 1500 may also include one or more display screens (not shown), indicator lights (e.g., light-emitting diodes, not shown), and one or more user-operated buttons (not shown), as described herein. A feedthrough 1509 may be mounted to or formed by the interior wall 1556 to accommodate routing of electrical lines between components located in the sensing housing 1542 (e.g., flow sensor 1574, valve 1586, etc.) and components located in the main housing 1526 (e.g., electronic circuitry 1564, power source, etc.).

The fluid flow meters 1400 and 1500 described herein and illustrated in FIGS. 14 and 15 may be effective in isolating the fluid being measured from electronic circuitry 1464 and 1564, respectively, and/or directing the fluid being measured away from such electronic circuitry 1464 and 1564.

In other embodiments, the flow sensing housing 1452 or 1542 may be installable in and removable from the fluid flow meter 1400 or 1500. For example, the flow sensing housing 1452 or 1542 may be removably engaged with the main housing 1456 or 1526 of the fluid flow meter 1400 or 1500. For example, the flow sensing housing 1452 or 1542 may be configured as a cartridge as described herein.

Figure 16:
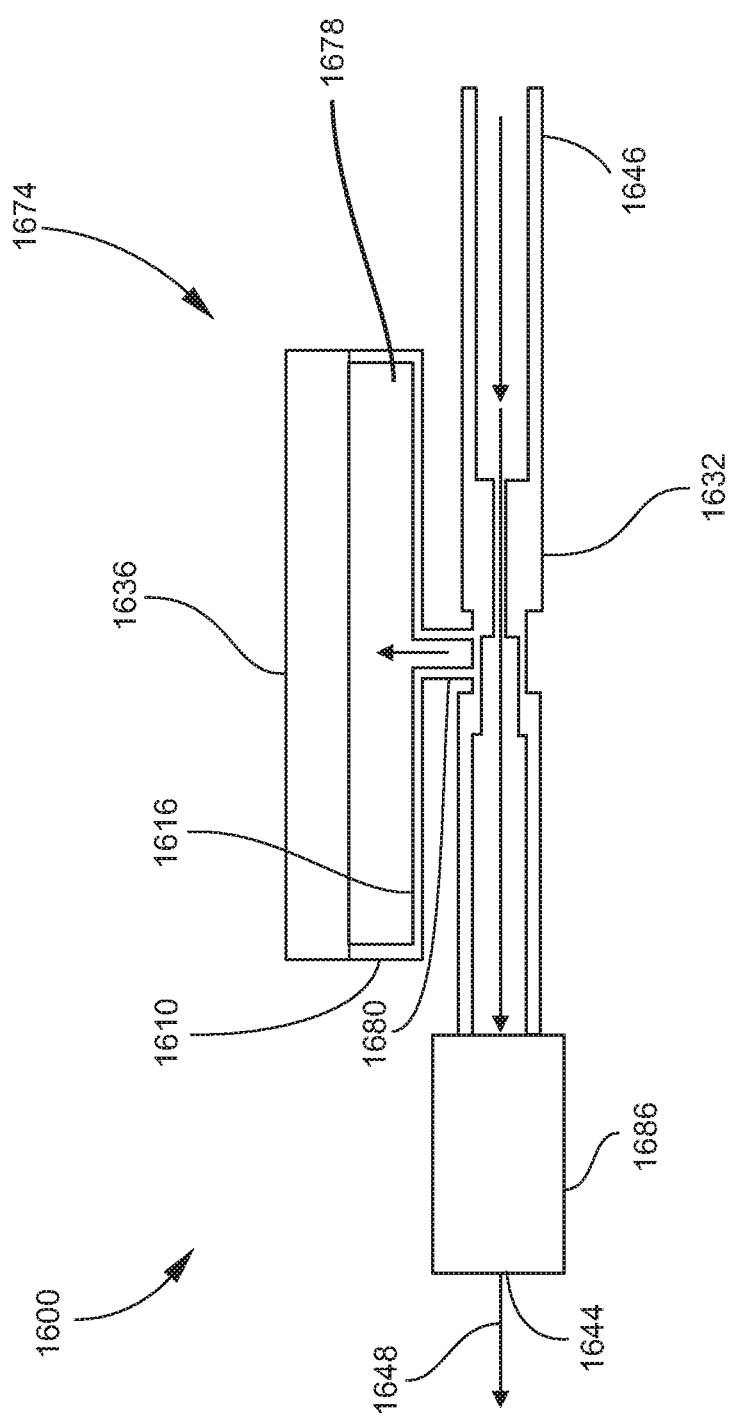
FIG. 16 is a schematic cross-sectional view of an example of a fluid flow meter according to another embodiment.

FIG. 16 is a schematic cross-sectional view of an example of a fluid flow meter 1600 according to another embodiment. As in certain other embodiments described herein, the flow meter 1600 may have a modular configuration. That is, some internal components of the flow meter 1600 may be housed in a flow meter mainframe while other internal components of the flow meter 1600 may be housed in a flow meter cartridge configured for removable installation in the mainframe. For example, components that affect the calibration or instrument drift of the flow meter 1600 (e.g., a fluid flow sensor 1674, a valve 1686, a memory containing calibration data, etc.) may be housed in a cartridge as described herein. The mainframe and the cartridge may include various other components provided by other embodiments described herein.

The flow meter 1600 includes a fluid inlet (or cartridge inlet) 1646 and a fluid outlet (or cartridge outlet) 1648. The fluid inlet 1646 may be or include an opening formed through an outer cartridge wall, thereby providing a fluid flow path from a point external to the cartridge into the cartridge interior. The fluid inlet 1646 may be configured as a port (or fluid fitting) configured for coupling with fluidics external to the flow meter 1600 such as a sample tube or other conduit. In some embodiments, the fluid inlet 1646 may be or include a barbed or Luer-type fitting for connecting to a sample tube. The flow meter 1600 may also include an internal passage of reduced flow area downstream from the fluid inlet 1646, such as a flow restrictor 1632.

The fluid outlet 1648 may be or include an opening formed through an outer cartridge wall, thereby providing a fluid flow path from the cartridge interior to a point external to the cartridge, such as shown for example in FIG. 1. In this case, the fluid outlet 1648 may be located such that fluid is discharged from the cartridge into the cartridge receptacle in which the cartridge is installed at a point surrounded by the mainframe, such as shown for example in FIG. 1. Alternatively, as also shown for example in FIG. 1, the fluid outlet 1648 may be located such that fluid is discharged from the cartridge directly to a point outside of the flow meter 1600 including outside of the cartridge receptacle. For example, the fluid outlet 1648 and the fluid inlet 1646 may both be located on a side of the cartridge directly exposed to the outside, i.e., at a point not surrounded or enclosed by the mainframe. In some embodiments the fluid outlet 1648 may be a vent communicating with the cartridge interior and with the ambient. In other embodiments, the fluid outlet 1648 may be a port (or fluid fitting) configured to be connected to a fluidic component outside the flow meter 1600 such as, for example, a conduit.

In some embodiments, the fluid outlet 1648 may be fluidly coupled to an outlet port 1644 of the valve 1686, or to an intervening outlet conduit (similar to the outlet conduit 1444 shown in FIG. 14) that is fluidly coupled to the outlet port 1644 of the valve 1686. In other embodiments, the fluid outlet 1648 may be separated from the outlet port 1644 of the valve 1686 (and from an intervening outlet conduit, if provided) by an open space in the cartridge interior, which configuration may be similar to that shown in FIG. 15, and in which case the open space in the cartridge interior is part of the fluid flow path from the fluid inlet 1646 to the fluid outlet 1648.

As in other embodiments, the flow sensor 1674 is configured to sense the flow rate of a fluid flowing along the flow path. For this purpose, the flow sensor 1674 includes a chamber port or inlet 1680 and a sensing chamber 1678 that are part of the fluid flow path, and a diaphragm (or speaker) 1636. In the illustrated embodiment, the volume of the sensing chamber 1678 is delimited by the diaphragm 1636, an inside surface 1616 facing the diaphragm 1636 at a distance therefrom, and one or more chamber walls 1610 between the diaphragm 1636 and the inside surface 1616. The inside surface 1616 and the chamber wall(s) 1610 may be parts of the structure of the cartridge or housing of the flow meter 1600. In the present embodiment, the chamber inlet 1680 also serves as the chamber outlet. That is, in this embodiment a single port (the chamber inlet 1680) provides fluid communication between the sensing chamber 1678 and the main flow path running from the fluid inlet 1646 to the fluid outlet 1648. The chamber inlet 1680 may be positioned at or substantially at the center of the sensing chamber 1678, on the side of the sensing chamber 1678 opposite to the diaphragm 1636, as illustrated. In other embodiments, the chamber inlet 1680 may be positioned at some distance from the center of the sensing chamber 1678.

Generally, the flow sensor 1674 may operate similarly to other embodiments described herein. Hence, the valve 1686 is switched alternately between an open state at which fluid is free to flow through the valve 1686 and thus no fluid flow sensing occurs, and a closed state at which the valve 1686 blocks fluid flow therethrough and fluid flow is sensed by the displacement of the diaphragm 1636 resulting from accumulation of fluid in the sensing chamber 1678.

In other embodiments, the flow meter 1600 may have a "non-cartridge" configuration, i.e., may not include a removable cartridge. In such embodiments, the flow meter 1600 may have a configuration similar to that described above and illustrated in FIG. 14 or FIG. 15.

Figure 17:
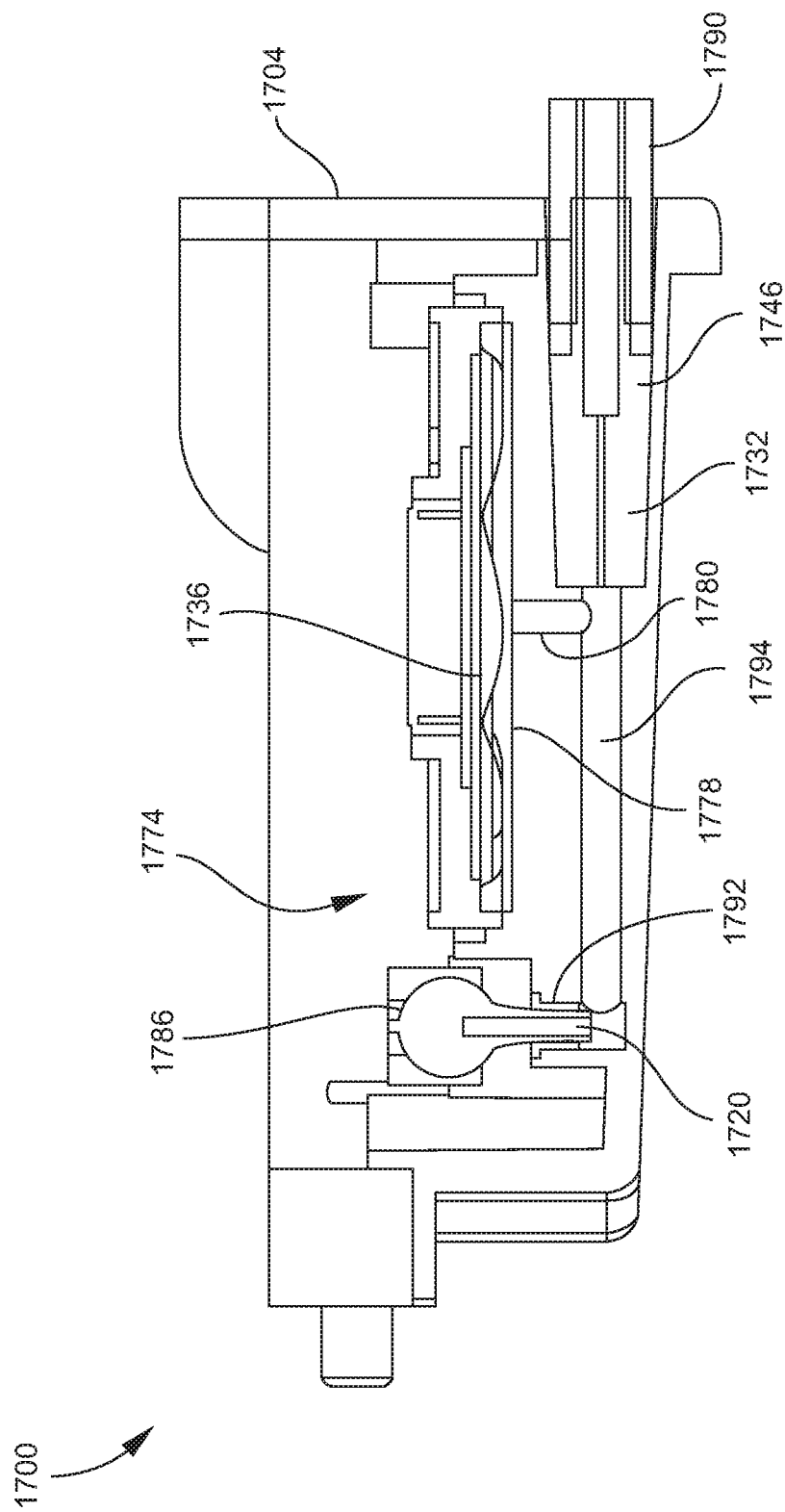
FIG. 17 is a schematic cross-sectional view of an example of a fluid flow meter according to another embodiment.

FIG. 17 is a schematic cross-sectional view of an example of a fluid flow meter 1700 according to another embodiment. As in certain other embodiments described herein, the flow meter 1700 has a modular configuration in which some internal components of the flow meter 1700 are housed in a flow meter mainframe (not shown) while other internal components of the flow meter 1700 are housed in a flow meter cartridge 1704 configured for removable installation in the mainframe. The flow meter 1700 may include a fluid inlet (or cartridge inlet) 1746, a fluid outlet (or cartridge outlet, not shown), a flow restrictor 1732, a valve 1786, and a fluid flow sensor 1774 including a chamber inlet 1780 (also serving as the chamber outlet), a sensing chamber 1778, and a diaphragm 1736. In the present embodiment, the fluid inlet 1746 and the flow restrictor 1732 are integrated as a single structure, which is recessed into the cartridge 1704 to protect the fluid inlet 1746 from being damaged. In use, a sample tube 1790 is coupled to the flow meter 1700 by inserting the end of the sample tube 1790 into the recess and into engagement with the fluid inlet 1746, which may be facilitated by a barb or similar feature. In the present embodiment, the chamber inlet 1780 is positioned at or substantially at the center of the sensing chamber 1778, on the side of the sensing chamber 1778 opposite to the diaphragm 1736. As also illustrated, a conduit 1794 providing the main flow path downstream from the sensing chamber 1778 communicates with an internal passage 1720 of the valve 1786, and the fluidic interface is sealed by a suitable valve seal 1792 (e.g., a grommet or the like). The mainframe and the cartridge 1704 may include various other components provided by other embodiments described herein. The flow meter 1700 may operate similarly to other embodiments described herein.

Figure 18:
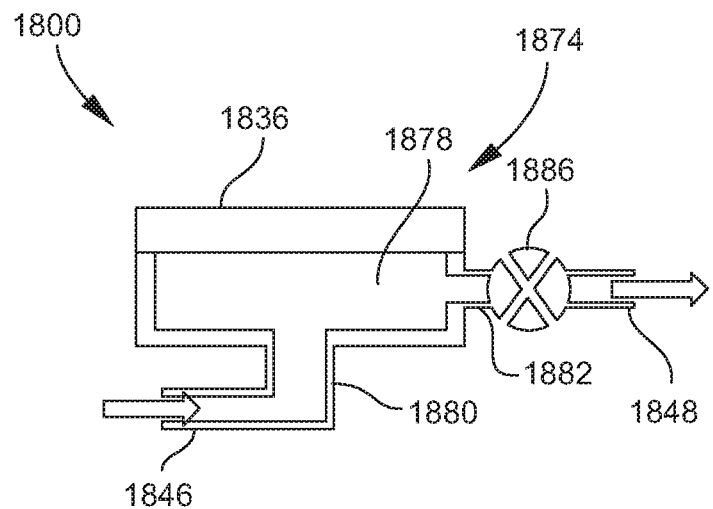
FIG. 18 is a schematic cross-sectional view of an example of a fluid flow meter according to another embodiment.

FIG. 18 is a schematic cross-sectional view of an example of a fluid flow meter 1800 according to another embodiment. The flow meter 1800 may include a fluid inlet 1846, a fluid outlet 1848, a valve 1886, and a fluid flow sensor 1874 including a chamber inlet 1880, a chamber outlet 1882, a sensing chamber 1878, and a diaphragm 1836. In this embodiment, the chamber inlet 1880 is positioned at or substantially at the center of the sensing chamber 1878 on the side of the sensing chamber 1878 opposite to the diaphragm 1836. The separate chamber outlet 1882 is positioned at the side of the sensing chamber 1878. In some embodiments, the foregoing components may be housed in a removable cartridge as described herein.

Figure 19:
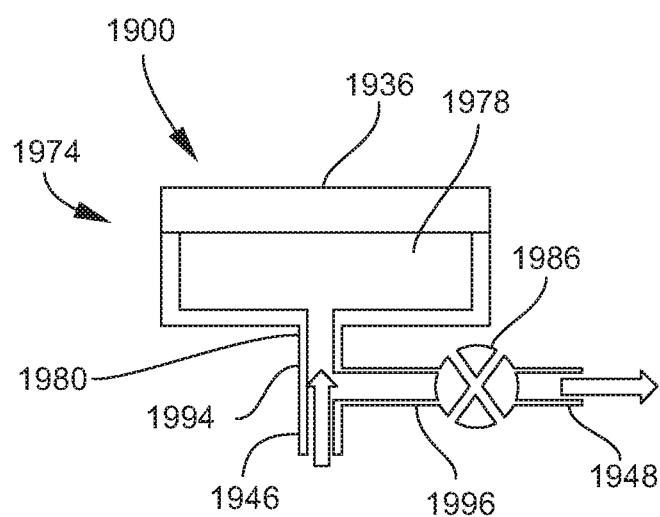
FIG. 19 is a schematic cross-sectional view of an example of a fluid flow meter according to another embodiment.

FIG. 19 is a schematic cross-sectional view of an example of a fluid flow meter 1900 according to another embodiment. The flow meter 1900 may include a fluid inlet 1946, a fluid outlet 1948, a valve 1986, and a fluid flow sensor 1974 including a chamber inlet 1980 (also serving as the chamber outlet), a sensing chamber 1978, and a diaphragm 1936. In this embodiment, the chamber inlet 1980 is positioned at or substantially at the center of the sensing chamber 1978, on the side of the sensing chamber 1978 opposite to the diaphragm 1936. A main conduit 1994 provides a flow path from the fluid inlet 1946 to the chamber inlet 1980 when the valve 1986 is closed. An outlet conduit 1996 is coupled to the main conduit 1994 as a side branch off of the main conduit 1994, and provides a flow path from the fluid inlet 1946 to (and through) the valve 1986 when the valve 1986 is open. In some embodiments, the foregoing components may be housed in a removable cartridge as described herein.

Figure 20:
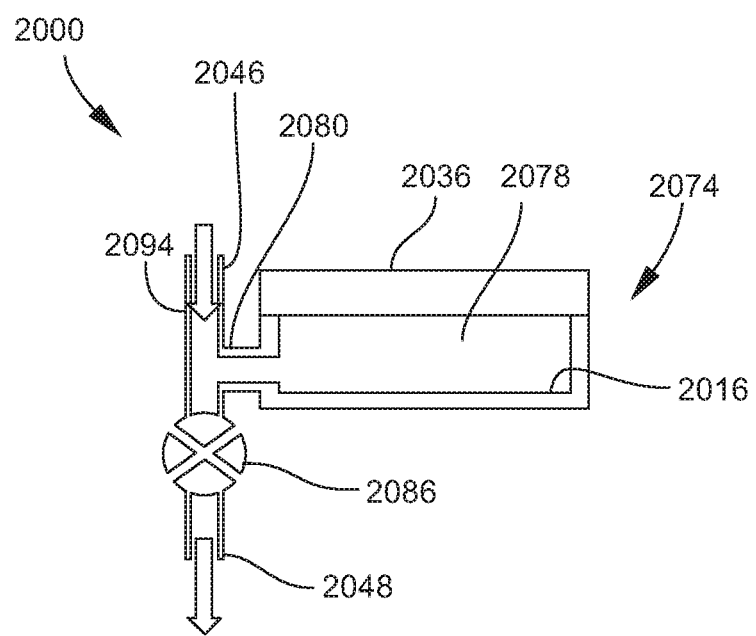
FIG. 20 is a schematic cross-sectional view of an example of a fluid flow meter according to another embodiment.

FIG. 20 is a schematic cross-sectional view of an example of a fluid flow meter 2000 according to another embodiment. The flow meter 2000 may include a fluid inlet 2046, a fluid outlet 2048, a valve 2086, and a fluid flow sensor 2074 including a chamber inlet 2080 (also serving as the chamber outlet), a sensing chamber 2078, and a diaphragm 2036. In this embodiment, the chamber inlet 2080 is positioned at a lateral side of the sensing chamber 2078 between the diaphragm 2036 and an opposing inside surface 2016. The chamber inlet 2080 (and other components of the fluid flow sensor 2074) are positioned in an offset or side-branch relation to a main conduit 2094 that provides a flow path from the fluid inlet 2046 to the fluid outlet 2048 via the valve 2086. In some embodiments, the foregoing components may be housed in a removable cartridge as described herein.

Other embodiments disclosed herein may include various combinations of one or more features described herein in relation to any of the flow meters 100, 200, 900, 1400, 1500, 1600, 1700, 1800, 1900, and 2000.

Another example of a method for operating a flow meter will now be described with the understanding that the example does not limit the broadest aspects of the subject matter disclosed herein. The method includes flowing a fluid into a housing of the flow meter. The housing includes a housing interior and the flow meter includes a chamber in the housing interior, a chamber inlet, and a flow sensor. The fluid flows through the chamber inlet and into the chamber. While the fluid flows, the flow sensor is operated to measure a flow rate of the fluid into the chamber. The flow sensor outputs a measurement signal, which is transmitted to an electronic circuit of the flow meter. In some embodiments, the fluid may flow through a chamber outlet that is separate from the chamber inlet.

Exemplary Embodiments

Exemplary embodiments provided in accordance with the presently disclosed subject matter include, but are not limited to, the following:

1. A cartridge for a flow meter, the cartridge comprising: a cartridge housing enclosing a cartridge interior, and configured for removable installation in a mainframe of a flow meter; a fluid inlet configured for conducting fluid from outside the cartridge housing to the cartridge interior; a chamber disposed in the cartridge interior; a chamber inlet communicating with the chamber; a flow sensor disposed in the cartridge interior and configured for measuring fluid flow rate into the chamber; and a fluid outlet, wherein the cartridge defines a flow path through the fluid inlet, through the chamber inlet, to the chamber, and toward the fluid outlet.

2. The cartridge of embodiment 1, comprising a valve disposed in the cartridge interior and in the flow path between the fluid inlet and the fluid outlet, wherein the valve is switchable between an open state allowing fluid flow through the valve, and a closed state blocking fluid flow through the valve.

3. The cartridge of embodiment 1, comprising at least one of the following configurations: the cartridge comprises an outlet conduit communicating with the chamber and extending through the cartridge interior to the fluid outlet, wherein the flow path is fluidly isolated from the cartridge interior; the fluid outlet comprises a vent communicating with the cartridge interior, wherein the flow path runs from the chamber, through the cartridge interior, and to the vent.

4. The cartridge of embodiment 1, comprising a chamber wall, wherein the chamber wall and the flow sensor cooperatively enclose the chamber.

5. The cartridge of embodiment 1, wherein the flow sensor comprises a displacement transducer.

6. The cartridge of embodiment 1, comprising a memory, or a memory containing flow measurement calibration data, disposed in the cartridge interior.

7. The cartridge of embodiment 1, comprising a first electrical connector configured for removable coupling with a second electrical connector of the mainframe.

8. The cartridge of embodiment 1, wherein the cartridge is configured for directing fluid in the chamber to flow through the chamber inlet and toward the fluid outlet.

9. The cartridge of embodiment 1, comprising an inside surface disposed at a distance from the flow sensor, and a chamber wall interposed between the inside surface and the flow sensor, wherein: the inside surface, the flow sensor, and the chamber wall cooperatively enclose the chamber; and the chamber inlet is disposed at the inside surface.

10. The cartridge of embodiment 9, comprising a chamber outlet communicating with the chamber, wherein the cartridge is configured for directing fluid through the chamber inlet, the chamber, and the chamber outlet, and toward the fluid outlet.

11. The cartridge of embodiment 10, wherein the chamber outlet is disposed at the chamber wall.

12. The cartridge of embodiment 1, comprising an inside surface disposed at a distance from the flow sensor, and a chamber wall interposed between the inside surface and the flow sensor, wherein: the inside surface, the flow sensor, and the chamber wall cooperatively enclose the chamber; and the chamber inlet is disposed at the chamber wall.

13. The cartridge of embodiment 1, comprising a chamber outlet communicating with the chamber, wherein the cartridge is configured for directing fluid through the chamber inlet, the chamber, and the chamber outlet, and toward the fluid outlet.

14. The cartridge of embodiment 1, wherein the fluid outlet communicates with an area outside of the cartridge housing.

15. A flow meter, comprising: the cartridge of embodiment 1; and a mainframe comprising a receptacle configured for receiving the cartridge, wherein the cartridge is movable through the receptacle between an uninstalled position at which the cartridge is unengaged with the mainframe, and an installed position at which the cartridge is engaged with the mainframe.

16. The flow meter of embodiment 15, wherein: the cartridge comprises a first electrical connector, and the mainframe comprises a second electrical connector configured for removable coupling with the first electrical connector; and the first electrical connector is uncoupled from the second electrical connector at the uninstalled position, and the first electrical connector is coupled with the second electrical connector at the installed position.

17. The flow meter of embodiment 16, wherein the mainframe comprises a mainframe interior and an interior wall disposed between the mainframe interior and the receptacle, and the second electrical connector is positioned at or proximate to the interior wall.

18. The flow meter of embodiment 15, wherein the mainframe comprises a mainframe interior and an interior wall disposed between the mainframe interior and the receptacle, and the interior wall is configured to fluidly isolate the receptacle from the mainframe interior.

19. The flow meter of embodiment 15, wherein the mainframe comprises a mainframe interior, and a mainframe component selected from the group consisting of: an electronic circuit disposed in the mainframe interior; an electronic circuit disposed in the mainframe interior and comprising at least a processor and a memory; an electronic circuit disposed in the mainframe interior and configured for receiving measurement signals outputted by the flow sensor; an electronic circuit disposed in the mainframe interior, and a user-operable button configured for providing an input to the electronic circuit; an electrical power source disposed in the mainframe interior; a display screen visible from outside the mainframe; and a combination of two or more of the foregoing.

20. The flow meter of embodiment 15, wherein the cartridge comprises a memory, or a memory containing flow measurement calibration data, disposed in the cartridge interior.

21. A method for operating a flow meter, the method comprising: installing a cartridge in a mainframe of the flow meter by moving the cartridge into a receptacle of the mainframe, wherein the cartridge comprises a cartridge interior, a chamber in the cartridge interior, a chamber inlet, and a flow sensor; flowing a fluid through the chamber inlet and into the chamber; while flowing the fluid, operating the flow sensor to measure a flow rate of the fluid into the chamber, wherein the flow sensor outputs a measurement signal; and transmitting the measurement signal to an electronic circuit disposed in the mainframe via the first electrical connector and the second electrical connector.

22. The method of embodiment 21, wherein installing the cartridge comprises coupling a first electrical connector of the cartridge with a second electrical connector of the mainframe, and transmitting the measurement signal is done via the first electrical connector and the second electrical connector.

23. The method of embodiment 21, wherein the installed cartridge is a first cartridge, and further comprising: uninstalling the first cartridge from the mainframe, and removing the first cartridge from the receptacle; and installing a second cartridge in the mainframe by moving the second cartridge into the receptacle, wherein the second cartridge comprises a second cartridge interior, a second chamber in the second cartridge interior, a second fluid inlet, a second fluid outlet, and a second flow sensor.

24. The method of embodiment 14, wherein the cartridge comprises a valve communicating with the chamber, and further comprising switching the valve from an open state in which fluid flows through the valve to a closed state in which fluid flow through the valve is blocked, wherein operating the flow sensor to measure the flow rate is done while the valve is in the closed state.

25. The method of embodiment 24, wherein operating the flow sensor to measure flow rate comprises measuring a displacement of a movable boundary of the chamber.

26. The method of embodiment 21, comprising flowing the fluid from the chamber to a location outside of the cartridge interior, without flowing the fluid into an interior of the mainframe containing the electronic circuit.

27. The method of embodiment 21, comprising transmitting calibration data from the cartridge to the electronic circuit, and calculating flow rate based on the measurement signal and the calibration data transmitted to the electronic circuit.

28. A flow meter, comprising: a housing enclosing a housing interior; a chamber disposed in the housing interior; a chamber inlet communicating with the chamber; a chamber outlet communicating with the chamber; a flow sensor configured for measuring fluid flow rate into the chamber; and a fluid outlet communicating with an area outside of the housing, wherein the housing defines a flow path through the chamber inlet, the chamber, and the chamber outlet, and to the fluid outlet.

29. The flow meter of embodiment 28, wherein: the housing comprises a sensor housing and a main housing fluidly isolated from the sensor housing; the chamber, the chamber inlet, and the chamber outlet are disposed in the sensor housing, and the fluid outlet is disposed at a side of the sensor housing; and the chamber, the chamber inlet, the chamber outlet, and the fluid outlet are arranged such that the flow path is directed away from the main housing.

30. The flow meter of embodiment 28, comprising at least one of the following configurations: the flow meter comprises an outlet conduit communicating with the chamber outlet and extending through the housing interior to the fluid outlet, wherein the flow path is fluidly isolated from the housing interior; the fluid outlet comprises a vent communicating with the housing interior, wherein the flow path runs from the chamber outlet, through the housing interior, and to the vent; the housing comprises a sensor housing, a main housing, and a wall fluidly isolating the main housing from the sensor housing, and the fluid outlet comprises a vent communicating with an interior of the sensor housing, wherein the flow path runs from the chamber outlet, through the interior of the sensor housing, and to the vent.

31. The flow meter of embodiment 28, wherein: the housing comprises a sensor housing and a main housing; the chamber, the chamber inlet, and the chamber outlet are disposed in the sensor housing, and the fluid outlet is disposed at a side of the sensor housing; and the sensor housing is configured for removable installation in a mainframe of a flow meter.

32. A method for operating a flow meter, the method comprising: flowing a fluid into a housing of the flow meter, the housing comprising a housing interior and the flow meter comprising a chamber in the housing interior, a chamber inlet, a chamber outlet, and a flow sensor; flowing the fluid through the chamber inlet, the chamber, and the chamber outlet; while flowing the fluid, operating the flow sensor to measure a flow rate of the fluid into the chamber, wherein the flow sensor outputs a measurement signal; and transmitting the measurement signal to an electronic circuit of the flow meter.

33. The method of embodiment 32, wherein: the housing comprises a sensor housing and a main housing fluidly isolated from the sensor housing; the chamber, the chamber inlet, and the chamber outlet are disposed in the sensor housing, and the fluid outlet is disposed at a side of the sensor housing; and further comprising flowing the fluid from the chamber outlet, through a fluid outlet of the flow meter, and to outside of the flow meter, without flowing the fluid into the main housing.

34. The method of embodiment 33, wherein the electronic circuit is in the main housing, and transmitting the measurement signal comprises transmitting the measurement signal from the sensor housing to the main housing through a wall between the sensor housing and the main housing.

35. The method of embodiment 32, wherein the housing comprises a sensor housing and a main housing fluidly isolated from the sensor housing, and further comprising at least one of: flowing the fluid from the chamber outlet, through an outlet conduit of the flow meter, through a fluid outlet of the flow meter, and to outside of the flow meter, without flowing the fluid into the main housing and without flowing the fluid into the housing interior; flowing the fluid from the chamber outlet, through the housing interior, through a fluid outlet of the flow meter, and to outside of the flow meter, without flowing the fluid into the main housing.

It will be understood that terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A cartridge for a flow meter, the cartridge comprising:
a cartridge housing enclosing a cartridge interior, and configured for removable installation in a mainframe of a flow meter;
a fluid inlet configured for conducting fluid from outside the cartridge housing to the cartridge interior;
a chamber disposed in the cartridge interior;
a chamber inlet communicating with the chamber;
a flow sensor disposed in the cartridge interior and configured for measuring fluid flow rate into the chamber, wherein the flow sensor comprises a displacement transducer disposed in the chamber; and
a fluid outlet,
wherein the cartridge defines a flow path through the fluid inlet, through the chamber inlet, to the chamber, and toward the fluid outlet.

2. The cartridge of claim 1, wherein the flow sensor comprises a component selected from the group consisting of:
a valve disposed in the cartridge interior and in the flow path between the fluid inlet and the fluid outlet, wherein the valve is switchable between an open state allowing fluid flow through the valve, and a closed state blocking fluid flow through the valve;
a chamber wall, wherein the chamber wall and the flow sensor cooperatively enclose the chamber; and
both of the foregoing.

3. The cartridge of claim 1, comprising a memory, or a memory containing flow measurement calibration data, disposed in the cartridge interior.

4. The cartridge of claim 1, comprising a first electrical connector configured for removable coupling with a second electrical connector of the mainframe.

5. The cartridge of claim 1, wherein the cartridge is configured for directing fluid in the chamber to flow through the chamber inlet and toward the fluid outlet.

6. The cartridge of claim 1, comprising an inside surface disposed at a distance from the flow sensor, and a chamber wall interposed between the inside surface and the flow sensor, wherein:
the inside surface, the flow sensor, and the chamber wall cooperatively enclose the chamber; and
the chamber inlet is disposed at the chamber wall.

7. The cartridge of claim 1, comprising a chamber outlet communicating with the chamber, wherein the cartridge is configured for directing fluid through the chamber inlet, the chamber, and the chamber outlet, and toward the fluid outlet.

8. The cartridge of claim 1, comprising an inside surface disposed at a distance from the flow sensor, and a chamber wall interposed between the inside surface and the flow sensor, wherein:
the inside surface, the flow sensor, and the chamber wall cooperatively enclose the chamber; and
the chamber inlet is disposed at the inside surface.

9. The cartridge of claim 8, comprising a chamber outlet communicating with the chamber and having a configuration selected from the group consisting of:
the cartridge is configured for directing fluid through the chamber inlet, the chamber, and the chamber outlet, and toward the fluid outlet;
the chamber outlet is disposed at the chamber wall; and
both of the foregoing.

10. A flow meter, comprising:
a mainframe comprising a receptacle; and
a cartridge comprising a cartridge housing enclosing a cartridge interior, and configured for removable installation in the mainframe, a fluid inlet configured for conducting fluid from outside the cartridge housing to the cartridge interior, a chamber disposed in the cartridge interior, a chamber inlet communicating with the chamber, a flow sensor disposed in the cartridge interior and configured for measuring fluid flow rate into the chamber, and a fluid outlet, wherein:
the flow sensor comprises a displacement transducer disposed in the chamber;
the cartridge defines a flow path through the fluid inlet, through the chamber inlet, to the chamber, and toward the fluid outlet; and
the cartridge is movable through the receptacle between an uninstalled position at which the cartridge is unengaged with the mainframe, and an installed position at which the cartridge is engaged with the mainframe.

11. The flow meter of claim 10, wherein the mainframe comprises a mainframe interior and an interior wall disposed between the mainframe interior and the receptacle, and the interior wall is configured to fluidly isolate the receptacle from the mainframe interior.

12. The flow meter of claim 10, wherein the mainframe comprises a mainframe interior, and a mainframe component selected from the group consisting of:
an electronic circuit disposed in the mainframe interior;
an electronic circuit disposed in the mainframe interior and comprising at least a processor and a memory;
an electronic circuit disposed in the mainframe interior and configured for receiving measurement signals outputted by the flow sensor;
an electronic circuit disposed in the mainframe interior, and a user-operable button configured for providing an input to the electronic circuit;
an electrical power source disposed in the mainframe interior;
a display screen visible from outside the mainframe; and
a combination of two or more of the foregoing.

13. The flow meter of claim 10, wherein:
the cartridge comprises a first electrical connector, and the mainframe comprises a second electrical connector configured for removable coupling with the first electrical connector; and
the first electrical connector is uncoupled from the second electrical connector at the uninstalled position, and the first electrical connector is coupled with the second electrical connector at the installed position.

14. The flow meter of claim 13, wherein the mainframe comprises a mainframe interior and an interior wall disposed between the mainframe interior and the receptacle, and the second electrical connector is positioned at or proximate to the interior wall.

15. A method for operating a flow meter, the method comprising:
installing a cartridge in a mainframe of the flow meter by moving the cartridge into a receptacle of the mainframe, wherein the cartridge comprises a cartridge housing enclosing a cartridge interior, a chamber in the cartridge interior, a chamber inlet, and a flow sensor disposed in the cartridge interior, and wherein the flow sensor comprises a displacement transducer disposed in the chamber;
flowing a fluid through the chamber inlet and into the chamber;
while flowing the fluid, operating the flow sensor to measure a flow rate of the fluid into the chamber, wherein the flow sensor outputs a measurement signal; and
transmitting the measurement signal to an electronic circuit disposed in the mainframe.

16. The method of claim 15, wherein installing the cartridge comprises coupling a first electrical connector of the cartridge with a second electrical connector of the mainframe, and transmitting the measurement signal is done via the first electrical connector and the second electrical connector.

17. The method of claim 15, wherein the installed cartridge is a first cartridge, and further comprising:
uninstalling the first cartridge from the mainframe, and removing the first cartridge from the receptacle; and
installing a second cartridge in the mainframe by moving the second cartridge into the receptacle,
wherein the second cartridge comprises a second cartridge interior, a second chamber in the second cartridge interior, a second fluid inlet, a second fluid outlet, and a second flow sensor.

18. The method of claim 15, comprising transmitting calibration data from the cartridge to the electronic circuit, and calculating flow rate based on the measurement signal and the calibration data transmitted to the electronic circuit.

19. The method of claim 15, wherein the cartridge comprises a valve communicating with the chamber, and further comprising switching the valve from an open state in which fluid flows through the valve to a closed state in which fluid flow through the valve is blocked, wherein operating the flow sensor to measure the flow rate is done while the valve is in the closed state.

20. The method of claim 19, wherein operating the flow sensor to measure flow rate comprises measuring a displacement of a movable boundary of the chamber.

* * * * *